US009346352B2

(12) United States Patent
Karube et al.

(10) Patent No.: US 9,346,352 B2
(45) Date of Patent: May 24, 2016

(54) ARRANGEMENT OF A VEHICLE ASSEMBLY MEMBER

(71) Applicant: HONDA MOTOR CO., LTD., Tokyo (JP)

(72) Inventors: Shinichi Karube, Florence, SC (US); Hironori Nozawa, Shiki (JP); Koji Sato, Kawagoe (JP); Tomohiro Nishida, Toda (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/636,922

(22) Filed: Mar. 3, 2015

(65) Prior Publication Data

US 2015/0274012 A1     Oct. 1, 2015

(30) Foreign Application Priority Data

Mar. 31, 2014    (JP) .................................. 2014-073704

(51) Int. Cl.
| | |
|---|---|
| *B60K 13/04* | (2006.01) |
| *B60K 17/16* | (2006.01) |
| *B60K 23/04* | (2006.01) |
| *B60K 17/22* | (2006.01) |
| *B60K 23/08* | (2006.01) |
| *B60K 5/00* | (2006.01) |

(52) U.S. Cl.
CPC ............. *B60K 17/20* (2013.01); *B60K 13/04* (2013.01); *B60K 17/22* (2013.01); *B60K 23/04* (2013.01); *B60K 23/08* (2013.01); *B60K 2005/003* (2013.01); *B60K 2023/046* (2013.01); *B60Y 2200/20* (2013.01)

(58) Field of Classification Search
CPC ........ B60K 17/20; B60K 17/22; B60K 23/08; B60K 13/04; B60K 17/24; B60K 23/04; B60K 2005/003; B60K 2023/046; B60Y 2200/20
See application file for complete search history.

(56) References Cited

U.S. PATENT DOCUMENTS

| | | | | |
|---|---|---|---|---|
| 5,605,213 A | * | 2/1997 | White | ..................... B60K 23/08 180/247 |
| 7,784,582 B2 | * | 8/2010 | Takahashi | ............ B60K 17/352 180/336 |
| 8,540,605 B2 | * | 9/2013 | Marur | ..................... F16H 59/04 192/3.62 |

(Continued)

FOREIGN PATENT DOCUMENTS

JP          2011-117511 A      6/2011

*Primary Examiner* — Drew Brown
(74) *Attorney, Agent, or Firm* — Honda Patents & Technologies North America, LLC; Clifford B Vaterlaus

(57) ABSTRACT

An arrangement for an assembly member of a vehicle includes a power unit for generating a driving force; a pair of left and right driving wheels; a propeller shaft extending in the forward and backward direction of the vehicle; a differential for transmitting the driving force to the pair of left and right driving wheels via a pair of left and right drive shafts; a switch for switching the diff-lock of the differential on and off; an exhaust pipe disposed on one side in the vehicle width direction with respect to the propeller shaft; and an assembly member for operating the switch via each of a plurality of operation side transmission members and a device side transmission member using an operating force applied to each of a plurality of operating elements; wherein the assembly member is disposed on the opposite side of the propeller shaft as the exhaust pipe.

20 Claims, 14 Drawing Sheets

(56) References Cited

U.S. PATENT DOCUMENTS

| | | | | |
|---|---|---|---|---|
| 8,725,376 B2* | 5/2014 | Murota | ............... | B60K 23/04 180/247 |
| 9,200,699 B2* | 12/2015 | Sato | ............... | F16H 48/30 |
| 2007/0068328 A1* | 3/2007 | Suzuki | ............... | B60W 10/119 74/523 |
| 2007/0235242 A1* | 10/2007 | Nozaki | ............... | B60K 23/08 180/247 |
| 2008/0098701 A1* | 5/2008 | Takeshima | ............... | F02M 35/024 55/385.3 |
| 2008/0210483 A1* | 9/2008 | Takahashi | ............... | B60K 17/352 180/250 |
| 2011/0111913 A1* | 5/2011 | Haggerty | ............... | F16D 37/02 475/231 |
| 2011/0130239 A1 | 6/2011 | Sato et al. | | |
| 2012/0266710 A1* | 10/2012 | Seegert | ............... | F16H 59/02 74/473.3 |
| 2014/0296018 A1* | 10/2014 | Nishida | ............... | B60K 20/02 475/198 |
| 2014/0303862 A1* | 10/2014 | Hoff | ............... | B60W 10/12 701/67 |
| 2015/0096822 A1* | 4/2015 | Sato | ............... | B60K 23/04 180/250 |
| 2015/0183320 A1* | 7/2015 | Cheng | ............... | B60K 23/04 701/69 |

* cited by examiner

ARRANGEMENT OF A VEHICLE ASSEMBLY MEMBER

TECHNICAL FIELD

The present disclosure relates to an arrangement for an assembly member of a vehicle.

CROSS REFERENCES TO RELATED APPLICATIONS

The present application claims priority under 35 U.S.C. §119 to Japanese Patent Application No. 2014-073704, filed Mar. 31, 2014, entitled "Arrangement Structure for Assembly Member of Vehicle," the contents of which are incorporated herein by reference in their entirety.

BACKGROUND

Differentials for vehicles have been disclosed in the past. Vehicles including such devices may be equipped with a propeller shaft for transmitting a driving force from a driving source, a differential having a locking mechanism (referred to as a diff-lock mechanism), cams for transmitting the driving force from the propeller shaft to the wheels via left and right driven shafts, and a lock pin for turning on the diff-lock by stopping the differential motion of the differential. The lock pin can be made to be slidable along the axial direction of a guide part in accordance with the push-pull operation of a cable connected to a lever or the like operated by an occupant.

SUMMARY

A mechanism is provided which connects an assembly member between an operating element such as a lever operated by an occupant, and a differential having a diff-lock mechanism.

In such instance, there has been a need for a structure which enables the assembly member to be arranged at an appropriate position in relation to peripheral members. Therefore, one aspect of the present disclosure is to arrange an assembly member at an appropriate position in relation to peripheral members in a vehicle.

As an example for solving the problem described above, the present disclosure describes an arrangement for an assembly member of a vehicle (1) including: a power unit (13) for generating a driving force; a pair of left and right driving wheels (RW) disposed on both sides in the vehicle width direction; a propeller shaft (14r) extending in the forward and backward direction of the vehicle in the center of the vehicle width direction or the vicinity thereof between a central part between the pair of left and right driving wheels (RW) and the power unit (13); a differential (15r) to which the propeller shaft (14r) is connected so as to transmit the driving force to the pair of left and right driving wheels (RW) via a pair of left and right drive shafts (16r) disposed on both sides in the vehicle width direction; a switch (197) for switching the diff-lock of the differential (15r) on and off; an exhaust pipe (90) disposed on one side in the vehicle width direction with respect to the propeller shaft (14r); a plurality of operation side transmission members (133, 135), one end of which is respectively connected to a plurality of operating elements (127, 141) disposed at a driver's seat (5a); a device side transmission member (123), one end of which is connected to the switch (197); and an assembly member (106) to which each of the other ends of the plurality of operation side transmission members (133, 135) and the device side transmission member (123) are respectively connected so as to operate the switch (197) via each of the plurality of operation side transmission members (133, 135) and the device side transmission member (123) with an operating force applied to each of the plurality of operating elements (127, 141); the assembly member (106) being disposed on a side of the propeller shaft (14r) opposite the exhaust pipe (90).

The disclosure further includes a back seat (75) positioned behind front seats (5a, 5b, 5c) including the driver's seat (5a); and a rear floor (60) positioned between the front seats (5a, 5b, 5c) and the back seat (75) so that occupants (Rp1, Rp2) of the back seat (75) may rest their feet on the rear floor (60); wherein the assembly member (106) is disposed beneath the rear floor (60), and a lid (64) enabling the opening/closing or attachment/detachment of at least part of the rear floor (60) is provided on the rear floor (60) facing the assembly member (106).

In one embodiment, a front floor (50) on which occupants (Dr, Fp1, Fp2) may rest their feet is provided in front of the front seats (5a, 5b, 5c), and the height of the footrest surface (62a) of the rear floor (60) and the assembly member (106) is greater than the height of the footrest surface (52a) of the front floor (50).

In another embodiment a front floor (50) on which occupants (Dr, Fp1, Fp2) may rest their feet is provided in front of the front seats (5a, 5b, 5c), and a housing member (55) having roughly the same length in the vehicle width direction as the front floor (50) and having roughly the same base height as the front floor (50) is provided beneath the front seats (5a, 5b, 5c) in front of the assembly member (106).

Another embodiment further includes a first support member (70) provided along the rear floor (60) so as to support the rear floor (60); and a second support member (71) forming an upward-opening U-shape with both ends connected to the first support member (70); wherein the assembly member (106) is attached so as to be placed in a central part (71m) in the direction in which the second support member (71) extends in a planar view.

In another embodiment a case (100) housing the assembly member (106) forms a long rectangular shape in the front-backward direction of the vehicle in a planar view; wherein the plurality of operation side transmission members (133, 135) are arranged facing the driver's seat (5a) from one of the short sides of the case (100); the device side transmission member (123) extends toward the differential (15r) from the other short side of the case (100); the central part (71m) of the second support member (71) extends in the long side direction of the case (100); a first standing part (71ℓ) on one side of the second support member (71) passes between the plurality of operation side transmission members (133, 135) and extends toward the first support member (70); and a second standing part (71r) on the other side of the second support member (71) extends toward the first support member (70) while avoiding the device side transmission member (123) and while bending further inward in the vehicle width direction than the central part (71m).

With one embodiment of the disclosure, the assembly member is disposed on the opposite side as the exhaust pipe in the vehicle width direction, so measures for preventing thermal damage become unnecessary. Examples of measures for preventing thermal damage include the selection of an optimal material (resin material or the like) for the assembly member, the installation of a heat-resistant cover or the like in addition to a mudguard cover, and the like, but these measures become unnecessary. Therefore, the assembly member can be disposed at an appropriate position in relation to peripheral members.

With one embodiment of the disclosure, the lid can be opened/closed or attached/detached at the feet of an occupant in the back seat, which facilitates the adjustment of the cable.

With another embodiment of the disclosure, it becomes difficult for mud to adhere to the rear floor or the assembly member even when mud or the like scatters from a front underneath part of the rear floor.

With a further embodiment of the disclosure the base of the front floor essentially extends to the rear end of the front seats from the perspective of the assembly member, so it becomes even more difficult for mud to further adhere to the rear floor or the assembly member even when mud or the like scatters from a front underneath part the rear floor.

With another embodiment of the present disclosure, even if an impact is sustained from the outside, the impact is input into the second support member, so the assembly member sustains practically no impact. Therefore, the assembly member can be protected.

With a further embodiment of the present disclosure, the arrangement or shape of the second support member is set in accordance with the relation to the arrangement, shape, or the like of the peripheral members, so the second support member does not impede the respective transmission member, and thereby facilitates the routing of the respective transmission member.

BRIEF DESCRIPTION OF THE DRAWINGS

FIG. 7 is a top view illustrating the assembly member of the vehicle together with the case and the like.

DETAILED DESCRIPTION

Figure 1:
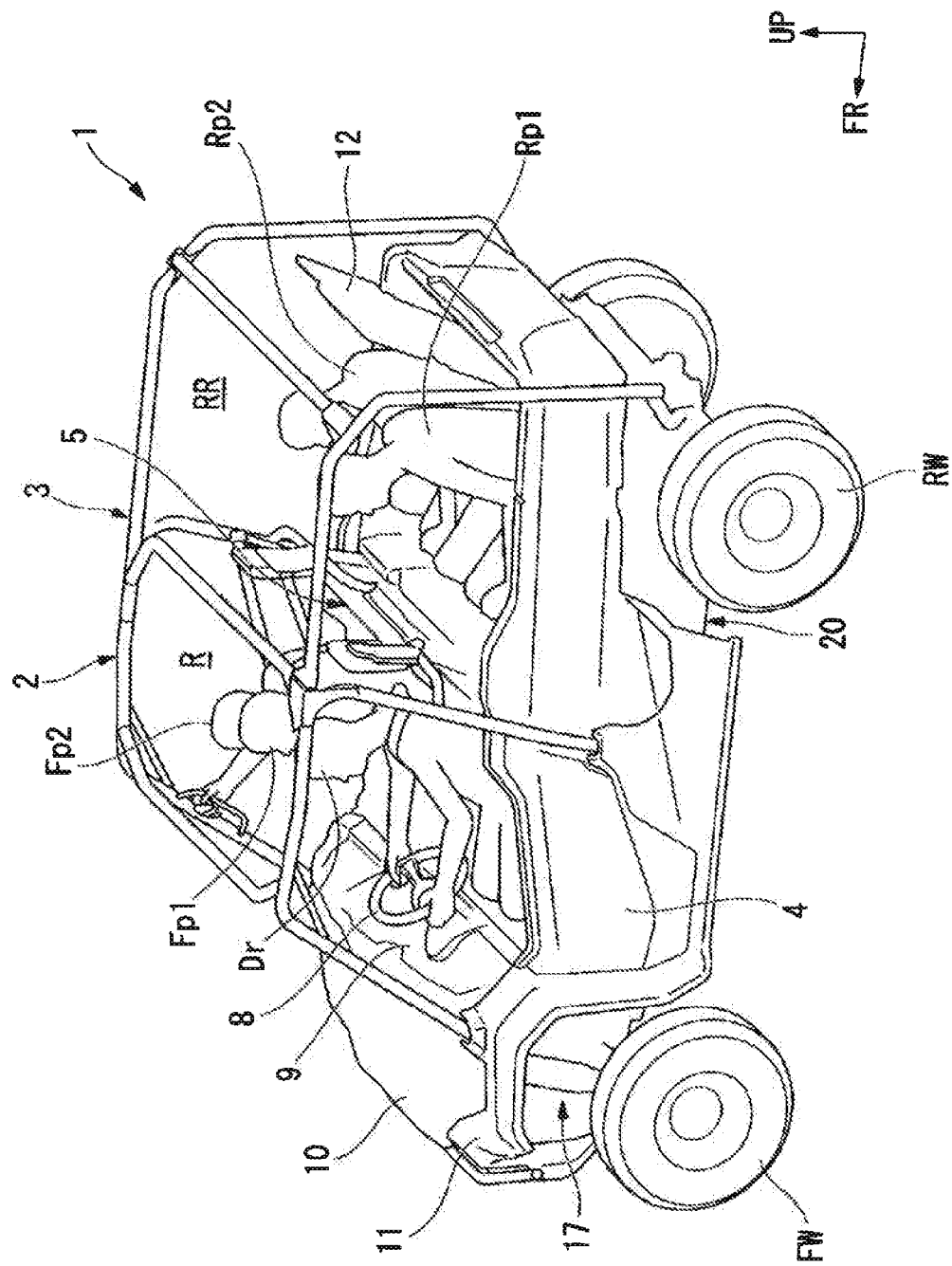
FIG. 1 is a perspective view of a vehicle in an embodiment of the present disclosure as viewed from the upper back left.

Embodiments of the present disclosure are described hereinafter with reference to the drawings. The orientations such as the front, back, left, and right directions in the following explanations shall be considered to be the same as the orientations of the vehicle described below unless specified otherwise. In addition, at appropriate places in the drawings used in the following explanations, an arrow FR indicating the front side of the vehicle, an arrow LH indicating the left side of the vehicle, and an arrow UP indicating the upper side of the vehicle are shown. The line CL in the drawings indicates the center line around the left and right sides of the vehicle body.

An example embodiment of a four-wheeled vehicle 1 (also simply called "vehicle 1" hereafter) illustrated in FIG. 1 is a so-called side-by-side type MIN (multi-utility vehicle). It will be understood that the embodiment of the vehicle 1 presented herein is for illustrative purposes only, and various modifications can be made to the vehicle 1 within the scope of the present disclosure. The vehicle 1 illustrated is one in which three occupants Dr, Fp1, and Fp2 (occupants of front seats 5a, 5b, and 5c) ride while sitting in a row in the vehicle width direction in the front seats. The vehicle 1 is equipped with front wheels FW serving as a pair of left and right steering wheels on both the left and right sides of the front of the vehicle body and is equipped with rear wheels RW serving as a pair of left and right driving wheels on both the left and right sides of the back of the vehicle body.

The vehicle 1 has a body 2 which defines a riding space R. The body 2 includes a roll bar 3, doors 4, an instrument panel 9, a vehicle body frame 20, and the like.

The roll bar 3 is positioned above the body 2. The roll bar 3 is formed from a steel pipe, a steel plate, or a synthetic resin, or the like, and encloses the vehicle space R.

The doors 4 are positioned on the left and right side ends in the vehicle width direction of the body 2. The doors 4 cover both the left and right sides of the riding space R. The instrument panel 9 is positioned at the front of the body 2.

The vehicle body frame 20 is positioned at the bottom of the body 2.

Seats 5 are disposed in the riding space R. A steering wheel 8 and the instrument panel 9 are disposed at the front of the riding space and in front of the seats 5. A front hood 10 is disposed in front of the instrument panel 9 as a continuation of the front part of the instrument panel 9. Front fenders 11 are disposed on the left and right sides of the front hood 10 as a continuation of the left and right side parts of the front hood 10.

A rear space RR serving as a trunk or a rear riding space is formed at the rear part of the riding space R and in back of the seats 5. FIG. 1 illustrates a state in which two rear occupants Rp1 and Rp2 (occupants of a back seat 75 (see FIG. 9)) ride while sitting in a row in the vehicle width direction in a seat (not illustrated) exposed by opening a floorboard 12 where luggage is placed.

Figure 2:
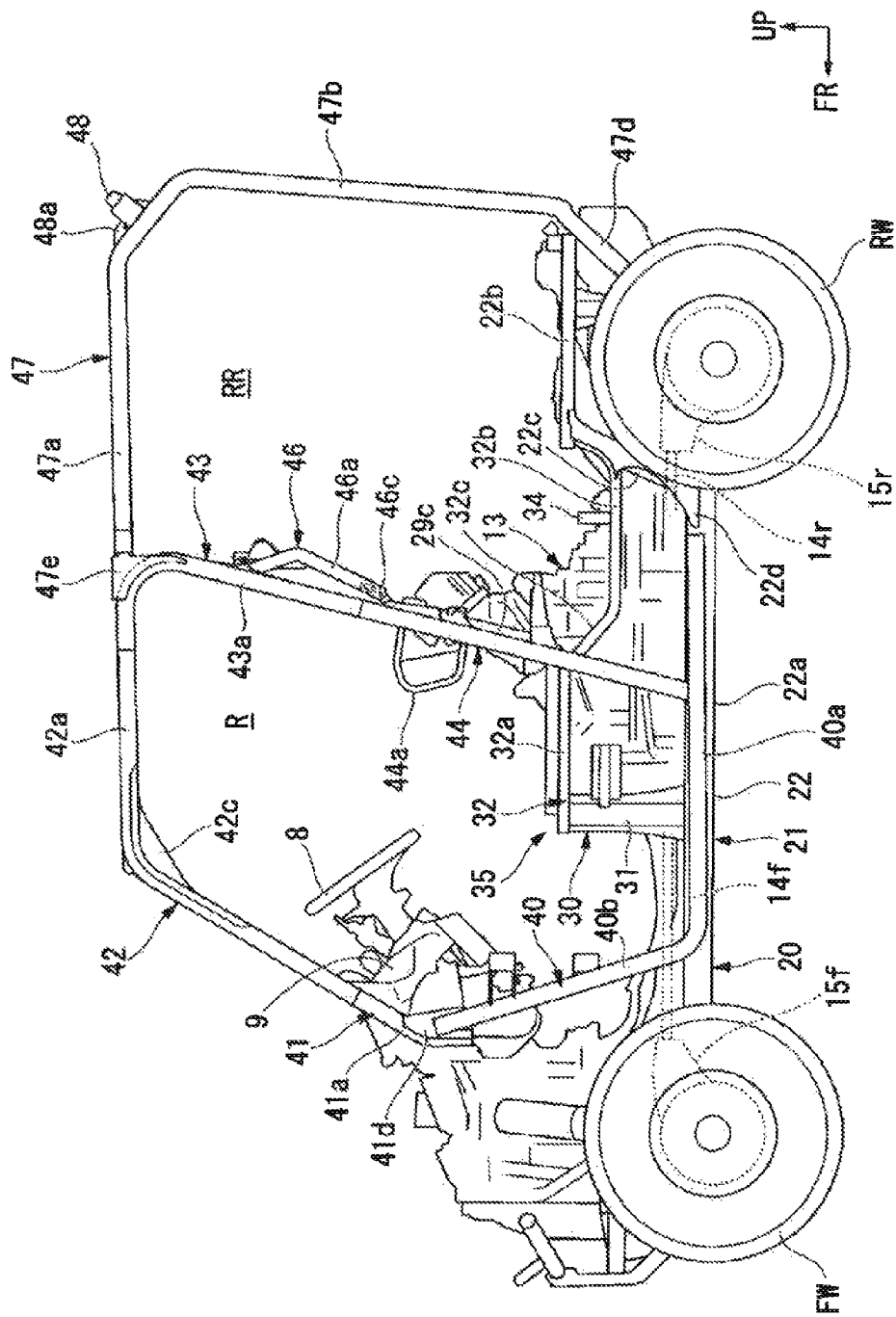
FIG. 2 is a left side view of the vehicle.
Figure 3:
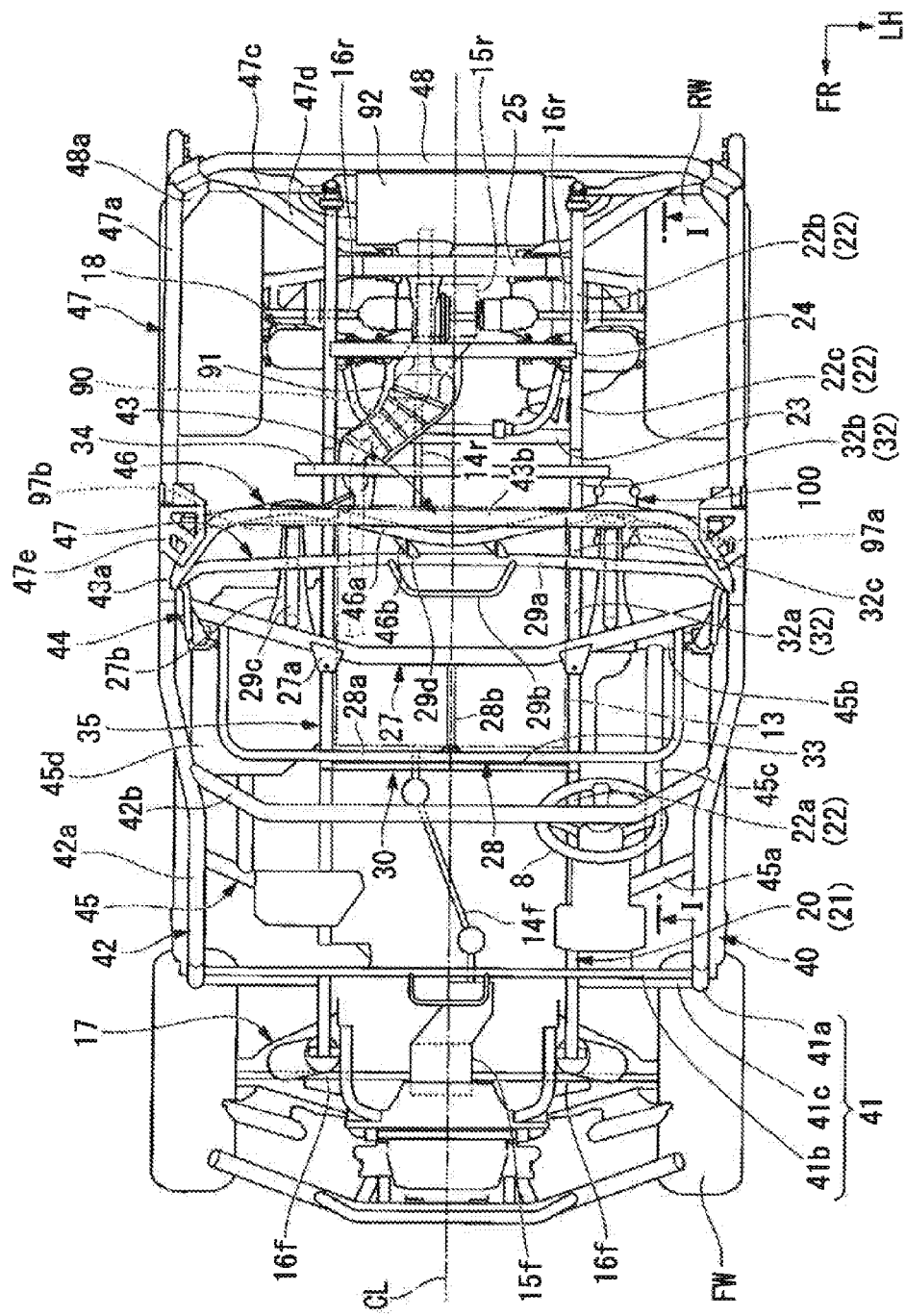
FIG. 3 is a top view of the vehicle.

Referring to FIGS. 2 and 3, a driving device 13 (power unit) for traveling supported on the vehicle body frame 20 is disposed behind and below the seats 5. The driving device 13 has at least one of an internal combustion engine or an electric motor as a motor. The driving device 13 outputs the driving force thereof to each of a front side propeller shaft 14$f$ and a rear side propeller shaft 14$r$.

The front side propeller shaft 14$f$ is connected to a front side differential 15$f$ supported on the front part of the vehicle body frame 20. The front side propeller shaft 14$f$ extends forward starting from the front right part of the driving device 13 when viewed from above, bends and extends diagonally to the front left, and then extends forward to reach the front side differential 15$f$. A front side drive shaft 16$f$ (see FIG. 3) extends to both sides in the vehicle width direction from the front side differential 15$f$, and this is connected to the left and right front wheels FW.

The rear side propeller shaft 14$r$ is connected to a rear side differential 15$r$ supported on the rear part of the vehicle body frame 20. The rear side propeller shaft 14$r$ extends backward starting from the back right part of the driving device 13 when viewed from above and reaches the rear side differential 15r. A rear side drive shaft 16r (see FIG. 3) extends to both sides in the vehicle width direction from the rear side differential 15r, and this is connected to the left and right rear wheels RW.

The vehicle body frame 20 has a frame main body 21, a subframe 30, center cross frame 27 (see FIG. 3), a seat cushion frame 28 (see FIG. 3), and a seat back frame 29 (see FIG. 3). The vehicle body frame 20 is formed by integrally connecting the separate subframe 30, center cross frame 27, seat cushion frame 28, and seat back frame 29 to the front and back direction central parts of the frame main body 21 including a pair of left and right side frames 22 with bolts or the like.

The frame main body 21 is formed by integrally joining a plurality of types of angular steel pipes by welding or the like. The left and right side frames 22 extend further in the front and back directions on the inside in the vehicle width direction than a pair of left and right side roll bars 40 constituting the body 2. The left and right side frames 22 extend linearly when viewed from above.

The left and right side frames 22 have center parts 22a, rear parts 22b, and stepped parts 22c.

The center parts 22a are disposed in parallel on the inside in the vehicle width direction of the left and right side roll bars 40 and extend forward and backward.

The rear parts 22b are positioned behind the center parts 22a and are displaced further upward than the center parts 22a at the bottom of the rear space RR so as to extend forward and backward.

The stepped parts 22c connect the front and back direction central parts of the rear parts of the center parts 22a and the front ends of the rear parts 22b.

A pair of left and right gussets 22d (see FIG. 2) are fixed so as to straddle the front and back direction central parts at the rear of the center parts 22a, the stepped parts 22c, and the front ends of the rear parts 22b.

Between the lower front ends of the stepped parts 22c of the left and right side frames 22, a rear lower cross frame 23 (see FIG. 3) is provided so as to extend to the left and right while forming a rectangular cross-sectional shape. Between the front ends of the rear parts 22b of the left and right side frames 22, a first rear upper cross frame 24 is provided so as to extend to the left and right while forming a rectangular cross-sectional shape. Between the rear ends of the rear parts 22b of the left and right side frames 22, a second rear upper cross frame 25 is provided so as to extend to the left and right while forming a rectangular cross-sectional shape. Between the rear ends of the center parts 22a of the left and right side frames 22, a rear end cross frame (not illustrated) is provided so as to extend to the left and right while forming a rectangular cross-sectional shape.

The subframe 30 is formed by integrally joining a plurality of types of angular steel pipes by welding or the like. The subframe 30 has a pair of left and right lower sub-side frames 31, a pair of left and right upper sub-side frames 32, a first upper cross frame 33, and a second upper cross frame 34. The left and right lower sub-side frames 31 extend roughly orthogonally upward from the front and back direction central parts at the front of the center parts 22a of the left and right side frames 22.

The left and right upper sub-side frames 32 have center parts 32a, rear parts 32b, and stepped parts 32c.

The center parts 32a are disposed at positions overlapping the front and back direction central parts of the center parts 22a of the left and right side frames 22 and extend forward and backward when viewed from above.

The rear parts 32b are disposed at positions overlapping the front and back direction central parts at the rear of the center parts 22a of the left and right side frames 22 and are displaced further downward than the center parts 32a so as to extend forward and backward when viewed from above. The rear ends of the rear parts 32b are connected to the top and bottom central parts of the stepped parts 22c of the left and right side frames 22.

The stepped parts 32c connect the rear ends of the center parts 32a and the front ends of the rear parts 32b.

The first upper cross frame 33 extends to the left and right while forming a rectangular cross-sectional shape and spans the area between the front ends of the left and right upper sub-side frames 32.

The second upper cross frame 34 extends to the left and right while forming a rectangular cross-sectional shape and spans the area between the rear ends of the left and right upper sub-side frames 32.

A box structure 35 is formed on the whole by the center parts 22a of the left and right side frames 22, the left and right lower sub-side frames 31, the left and right upper sub-side frames 32, the first upper cross frame 33, and the second upper cross frame 34. The driving device 13 can be mounted inside this box structure 35.

The center cross frame 27 is positioned on the upper side of the left and right upper sub-side frames 32 and extends to the left and right while forming a rectangular cross-sectional shape so as to span the area between the top and bottom central parts of left and right center side roll bars 44 described below. The central part in the vehicle width direction of the center cross frame 27 extends linearly in the vehicle width direction when viewed from above. The outer part in the vehicle width direction of the center cross frame 27 is inclined when viewed from above so as to be positioned as much to the back in the forward and backward direction of the vehicle as the outside in the vehicle width direction.

A pair of left and right gussets 27a (see FIG. 3) are fixed so as to straddle the outer part in the vehicle width direction of the center cross frame 27 and the center parts 32a of the left and right upper sub-side frames 32.

The seat cushion frame 28 has a main body part 28a and a coupling part 28b.

The main body part 28a is positioned on the upper side of the left and right upper sub-side frames 32 and extends to the left and right while forming a rectangular cross-sectional shape so as to couple the left and right outer parts in the vehicle width direction of the center cross frame 27. The main body part 28a forms a U-shape when viewed from above.

The coupling part 28b couples the central part in the vehicle width direction of the main body part 28a and the central part in the vehicle width direction of the center cross frame 27. The coupling part 28b extends linearly in the forward and backward direction of the vehicle when viewed from above. The seat back frame 29 has a cross part 29a, a support part 29b, a pair of left and right coupling parts 29c, and a pair of left and right connection parts 29d.

The cross part 29a extends to the left and right while forming a rectangular cross-sectional shape so as to span the area between the top and bottom central parts of the left and right center side roll bars 44 described below. The central part in the vehicle width direction of the cross part 29a approaches the central part in the vehicle width direction of a cross part 46a of a center cross roll bar 46 described below.

The support part 29b forms a U-shape projecting downward to the front from the central part in the vehicle width direction of the cross part 29a.

The left and right coupling parts 29c extend upward and downward while forming a rectangular cross-sectional shape so as to span the area between the cross part 29a and the outer part in the vehicle width direction of the center cross frame 27.

A pair of left and right gussets 27b (see FIG. 3) are fixed so as to straddle the lower ends of the left and right coupling parts 29c and the outer part in the vehicle width direction of the center cross frame 27.

The left and right connection parts 29d project upward toward the cross part 46a of the center cross roll bar 46 described below from the central part in the vehicle width direction of the cross part 29a.

Left and right front wheels FW are suspended via an independent suspension type (double wishbone type) front suspension 17 on the front part of the vehicle body frame 20. Left and right rear wheels RW are suspended via an independent suspension type (double wishbone type) rear suspension 18 on the rear part of the vehicle body frame 20.

The roll bar 3 is formed by integrally joining a plurality of types of rounded steel tubes by welding or the like. The roll bar 3 has a pair of left and right side roll bars 40, a front top roll bar 41, a front upper roll bar 42, a center upper roll bar 43, a pair of left and right center side roll bars 44, a lower roll bar 45, a center cross roll bar 46, a pair of left and right rear side roll bars 47, and a rear cross roll bar 48.

The left and right side roll bars 40 extend linearly in the forward and backward direction of the vehicle when viewed from above. The left and right side roll bars 40 have a pair of left and right lower parts 40a and a pair of left and right front parts 40b.

The left and right lower parts 40a are disposed beneath the left and right doors 4 and are disposed at positions overlapping the front and back direction central parts of the center parts 22a of the left and right side frames 22 so as to extend forward and backward when viewed from the side.

The left and right front parts 40b are connected to the front ends of the left and right lower parts 40a and are inclined when viewed from the side so as to be positioned as much forward in the forward and backward direction of the vehicle as the upper side.

The front top roll bar 41 has a pair of left and right top side parts 41a, an upper cross part 41b, and a lower cross part 41c.

The left and right top side parts 41a connect the upper ends of the front parts 40h of the left and right side roll bars 40 and the lower ends on the front part of the left and right upper side parts 42a of the front upper roll bar 42. The lower parts of the left and right top side parts 41a extend roughly orthogonally in the vertical direction when viewed from the side. The upper parts of the left and right top side parts 41a are inclined when viewed from the side so as to be positioned as far back in the forward and backward direction of the vehicle as the upper side.

A pair of left and right gussets 41d (see FIG. 2) are fixed so as to straddle the lower ends of the left and right top side parts 41a and the upper ends of the front parts 40b of the left and right side roll bars 40.

The upper cross part 41b extends to the left and right while forming a circular cross-sectional shape so as to span the area between the upper ends of the left and right top side parts 41a.

The lower cross part 41c extends to the left and right while forming a circular cross-sectional shape so as to span the area between the lower ends of the left and right top side parts 41a.

The front upper roll bar 42 has a pair of left and right upper side parts 42a and a cross part 42b.

The left and right upper side parts 42a are disposed at the left and right side parts in the vehicle width direction of the riding space R. The front parts of the left and right upper side parts 42a are inclined when viewed from the side so as to be positioned as far forward in the forward and backward direction of the vehicle as the lower side. The rear parts of the left and right upper side parts 42a are connected to the rear ends at the front of the left and right upper side parts 42a and extend roughly horizontally in the forward and backward direction when viewed from the side.

A pair of left and right gussets 42c (see FIG. 2) are fixed so as a straddle the rear ends of the front parts of the left and right upper side parts 42a and the front ends of the rear parts of the left and right upper side parts 42a.

The left and right upper side parts 42a extend linearly in the forward and backward direction of the vehicle starting from the connection points with the left and right top side parts 41a when viewed from above, after which they incline backward and outward while bending toward the outside in the vehicle width direction from in front of the connection point with the cross part 42b, and then extend linearly in the forward and backward direction of the vehicle toward the connection part with the cross part 43b of the center upper roll bar 43.

The cross part 42b extends to the left and right while forming a circular cross-sectional shape so as to span the area between the front and back direction central part of the left and right upper side parts 42a. The central part in the vehicle width direction of the cross part 42b extends roughly horizontally in the vehicle width direction when viewed from above. The left and right outside parts in the vehicle width direction of the cross part 42b are inclined when viewed from above so as to be positioned as far back in the forward and backward direction of the vehicle as the outside in the vehicle width direction.

The center upper roll bar 43 has a pair of left and right center side parts 43a and a cross part 43b.

The left and right center side parts 43a extend vertically while forming an L-shape when viewed from the side. The front ends at the top of the left and right center side parts 43a are connected to the rear ends of the rear parts of the left and right upper side parts 42a of the front upper roll bar 42. The lower ends of the lower parts of the left and right center side parts 43a are inclined and extend linearly when viewed from the side so as to be positioned as far forward in the forward and backward direction of the vehicle as the lower side.

The cross part 43b extends to the left and right while forming a circular cross-sectional shape so as to span the area between the front parts of the upper parts of the left and right center side parts 43a. The central part in the vehicle width direction of the cross part 43b extends linearly in the vehicle width direction when viewed from above. The left and right outer parts in the vehicle width direction of the cross part. 43b are inclined when viewed from above so as to be positioned as far forward in the forward and backward direction of the vehicle as the outside in the vehicle width direction.

The upper ends of the left and right center side roll bars 44 are connected to the lower ends of the left and right center side parts 43a of the center upper roll bar 43, and the lower ends thereof are connected to the left and right ends in the vehicle width direction of the cross part 45b of the lower roll bar 45. The left and right center side roll bars 44 are inclined when viewed from the side so as to be positioned as far forward in the forward and backward direction of the vehicle as the lower side and extend linearly, connected to the left and right center side parts 43a. Support brackets 44a (see FIG. 2) for the left and right doors 4 (see FIG. 1) are provided so as to project forward at the upper parts of the left and right center side roll bars 44.

The lower roll bar 45 has a pair of left and right support parts 45a, a cross part 45b, and a pair of left and right coupling parts 45c.

The left and right support parts 45*a* extend to the left and right while forming a circular cross-sectional shape so as to span the area between the front parts of the left and right lower parts 40*a* of the left and right side roll bars 40 and the center parts 22*a* of the left and right side frames 22. The left and right ends in the vehicle width direction of the left and right support parts 45*a* are inclined when viewed from above so as to be positioned as far back in the forward and backward direction of the vehicle as the outside in the vehicle width direction.

A pair of left and right gussets 22*e* (see FIG. 4) are fixed so as to straddle the inside ends in the vehicle width direction of the left and right support parts 45*a* and the front parts of the center parts 22*a* of the left and right side frames 22.

The cross part 45*b* extends to the left and right while forming a circular cross-sectional shape so as to span the area between the rear parts of the left and right lower parts 40*a* of the left and right side roll bars 40. The central part in the vehicle width direction of the cross part 45*b* is integrally coupled to the frame main body 21 of the vehicle body frame 20 by bolts or the like.

The left and right coupling parts 45*c* extend forward and backward while forming a circular cross-sectional shape so as to span the area between the left and right support parts 45*a* and the outer ends in the vehicle width direction of the cross part 45*b*. The left and right coupling parts 45*c* extend linearly in the forward and backward direction of the vehicle.

A gusset 45*d* (see FIG. 3) is fixed so as to straddle the right side end of the cross part 45*b* and the rear part of the right side coupling part 45*c*. The center cross roll bar 46 has a cross part 46*a* and a pair of left and right connection parts 46*b*.

The cross part 46*a* extends to the left and right while forming a circular cross-sectional shape so as to span the area between the vertical central parts of the left and right center side parts 43*a* of the center upper roll bar 43. The central part in the vehicle width direction of the cross part 46*a* forms a convex curved shape in the downward direction.

A first bracket 97*a* (see FIG. 8), which supports a headrest 98*a* for the driver Dr, is provided so as to project upward at the center of the vehicle width direction on the left side part in the vehicle width direction of the cross part 46*a*. A second bracket 97*b* (see FIG. 8), which supports a headrest 98*b* for the second passenger Fp2, is provided so as to project upward at the center of the vehicle width direction the right side part in the vehicle width direction of the cross part 46*a*.

A pair of left and right gussets 46*c* are fixed so as to straddle the outer part in the vehicle width direction of the cross part 46*a* and the vertical central parts of the left and right center side parts 43*a* of the center upper roll bar 43.

The left and right connection parts 46*b* project downward from the central part in the vehicle width direction of the cross part 46*a* toward the cross part 29*a* of the seat back frame 29. When the left and right connection parts 46*h* of the center cross roll bar 46 and the left and right connection parts 29*b* of the seat back frame 29 are connected, the area between the central parts in the vehicle width direction of the cross part 46*a* of the center cross roll bar 46 and the cross part 29*a* of the seat back frame 29 is spanned.

The left and right rear side roll bars 47 are disposed on the left and right side parts in the vehicle width direction of the rear space RR. The left and right rear side roll bars 47 have a pair of left and right upper parts 47*a*, a pair of left and right rear parts 47*b*, a pair of left and right lower parts 47*c*, and a pair of left and right rear end parts 47*d*.

The left and right upper parts 47*a* are coupled to the left and right center side parts 43*a* of the center upper roll bar 43 by bolts or the like, and extend linearly in the forward and backward direction of the vehicle when viewed from above.

A pair of left and right gussets 47*e* are fixed so as to straddle the front ends of the left and right upper parts 47*a* and the left and right center side parts 43*a* of the center upper roll bar 43.

The left and right rear parts 47*b* are connected to the rear ends of the left and right upper parts 47*a* and are gently inclined when viewed from the side so as to be positioned as far forward in the forward and backward direction of the vehicle as the lower side.

The left and right lower parts 47*c* are connected to the lower ends of the left and right rear parts 47*b* and extend inward in the vehicle width direction.

The left and right rear end parts 47*d* are connected to the central parts in the vehicle width direction of the left and right lower parts 47*c* and are inclined when viewed from above so as to be positioned as far inward in the vehicle width direction as the front side.

The rear cross roll bar 48 extends to the left and right while forming a circular cross-sectional shape so as to span the area between the bent parts of the left and right rear side roll bars 47 (the portion coupling the left and right upper parts 47*a* and the left and right rear parts 47*b*). A pair of left and right gussets 48*a* are fixed so as to straddle the outer ends in the vehicle width direction of the rear cross roll bar 48 and the bent parts of the left and right rear side roll bars 47.

Figure 4:
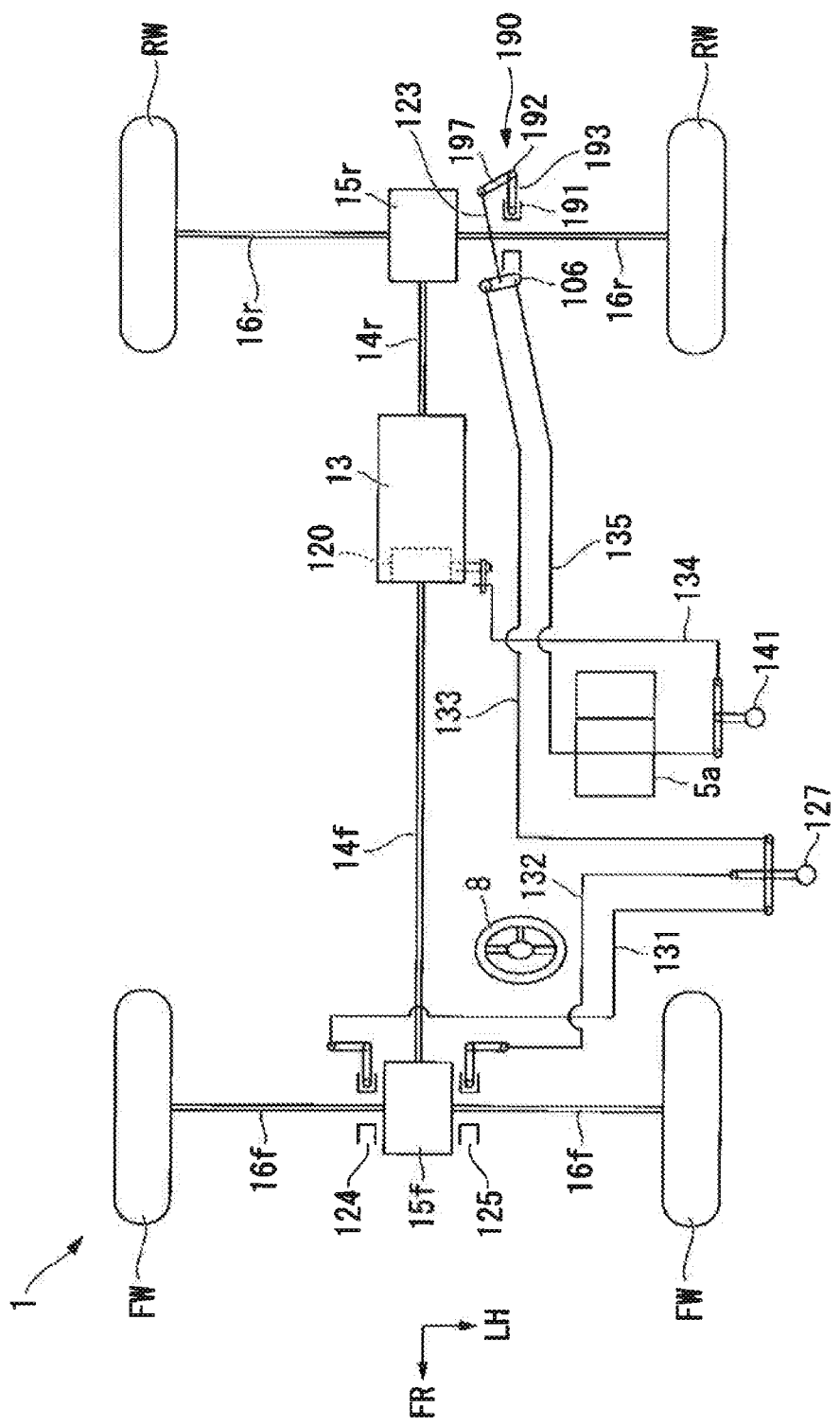
FIG. 4 is a top view illustrating the drive system of the vehicle.

Referring to FIGS. 3 and 4, the vehicle 1 further comprises a transmission 120. For example, the transmission 120 is a gear-type transmission which varies the power of the driving device 13. The front side propeller shaft 14*f* and the rear side propeller shaft 14*r* respectively extend from the transmission 120 in the forward and backward direction of the vehicle.

The vehicle 1 can be applied as an irregular ground traveling vehicle capable of traveling on irregular ground surfaces such as fields in addition to flat road surfaces. The front side differential 15*f* is provided with a front side diff-lock mechanism 124 and a two-wheel/four-wheel drive switching mechanism 125. The rear side differential 15*r* is provided with a rear side duff-lock mechanism 190 for setting a differential mechanism 174 (see FIG. 6) to a non-differential state.

The vehicle 1 is equipped with a first operating element 127 and a second operating element 141 in the vicinity of the driver's seat 5*a* where the driver Dr sits.

For example, the first operating element 127 is a switching lever for switching the driving mode. The first operating element 127 is coupled to the front side diff-lock mechanism 124 via a first wire 131 and is coupled to the two-wheel/four-wheel drive switching mechanism 125 via a second wire 132. In addition, the first operating element 127 is coupled to a slide member 191 via a first cable 133 (operation side transmission member).

For example, the second operating element 141 is a switching lever—that is, a shift lever—for switching the traveling mode, including a parking mode. The second operating element 141 is coupled to the transmission 120 via a third wire 134 and is coupled to the slide member 191 via, a second cable 135 (operation side transmission member).

Figure 5:
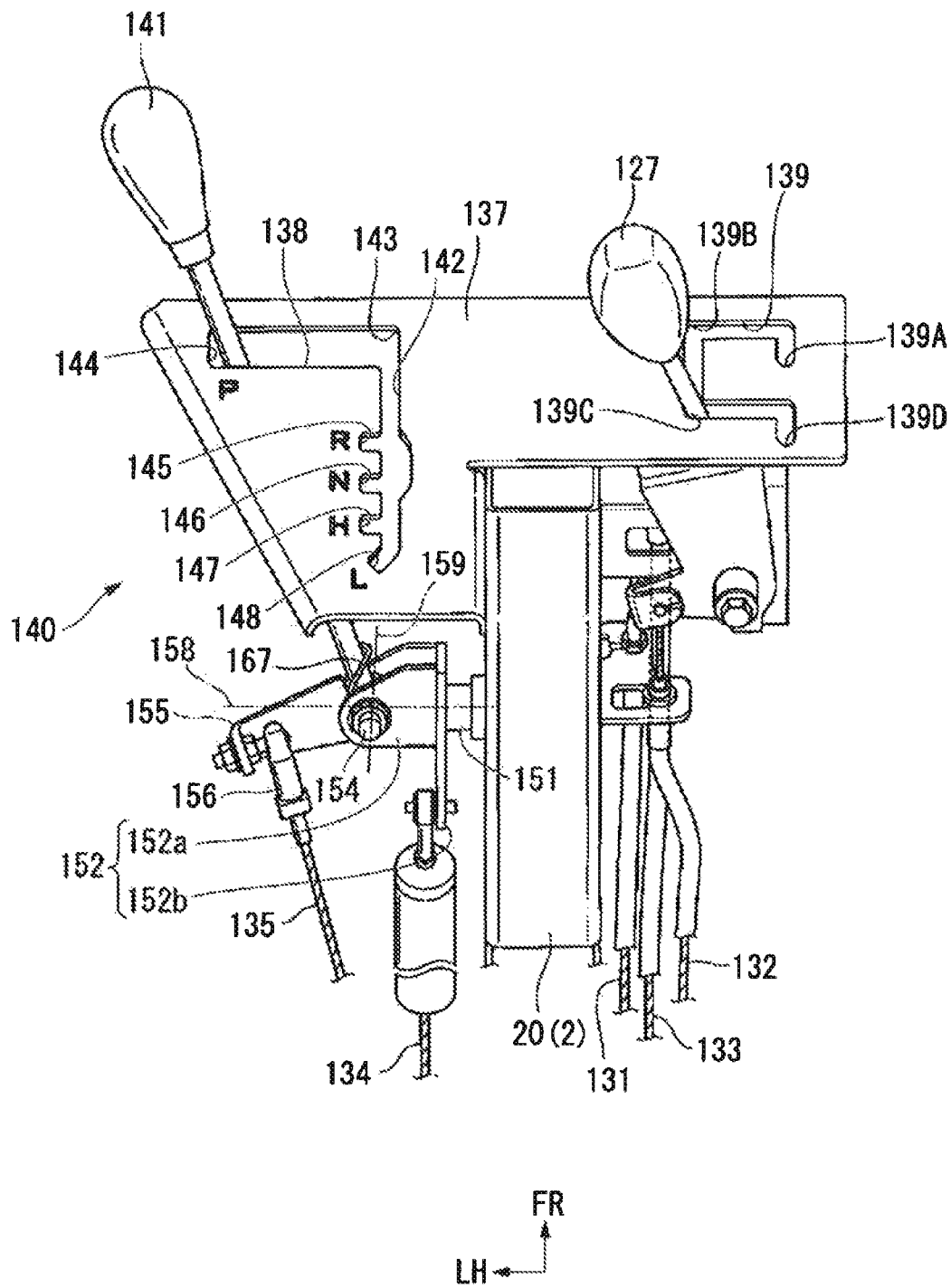
FIG. 5 is a perspective view of the arrangement of the first and second operating elements of the vehicle when viewed from the upper back.

Referring to FIGS. 2 and 5, a shift lever panel 137 is attached to the instrument panel 9. The shift lever panel 137 is not limited to being attached to the instrument panel 9 and may also be attached to a bracket, a column, or the like provided on the vehicle body frame 20. That is, the shift lever panel 137 may be attached to the front part of the body 2.

The shift lever panel 137 is provided with an L-shaped hole 138. The second operating element 141 is inserted into the hole 138. In FIG. 5, a U-shaped hole 139 is provided on the right side of the shift lever panel 137. The first operating element 127 is inserted into the hole 139.

One end of the first wire 131, one end of the second wire 132, and one end of the first cable 133 are respectively coupled to the first operating element 127. The first wire 131, the second wire 132, and the first cable 133 are respectively operated by moving the first operating element 127.

Specifically, the first operating element 127 can be set to the four positions 139A to 139D with the hole 139. By selectively moving the first operating element 127 to one of the positions 139A to 139D, the driving mode and the differential mode are selected.

For example, by moving the first operating element 127 to position 139A, four-wheel drive is selected as the driving mode, and a differential mode is selected so that the front side cliff-lock is turned on and the rear side diff-lock is turned on.

In addition, by moving the first operating element 127 to position 139B, four-wheel drive is selected as the driving mode, and a differential mode is selected so that the front side diff-lock is turned off and the rear side diff-lock is turned on.

In addition, by moving the first operating element 127 to position 139C, two-wheel drive is selected as the driving mode, and a differential mode is selected so that the front side diff-lock is turned off and the rear side diff-lock is turned on.

In addition, by moving the first operating element 127 to position 139D, two-wheel drive is selected as the driving mode, and a differential mode is selected so that the front side diff-lock is turned off and the rear side diff-lock is turned off.

One end of the third wire 134 and one end of the second cable 135 are respectively coupled to the second operating element 141. When the second operating element 141 is moved, the third wire 134 and the second cable 135 are respectively operated.

The hole 138 is provided with a parking gate 144, a reverse movement gate 145, a neutral gate 146, a high-speed forward movement gate 147, and a low-speed forward movement gate 148. A shifting operation is performed by setting the second operating element 141 to one of the parking gate 144, the reverse movement gate 145, the neutral gate 146, the high-speed forward movement gate 147, or the low-speed forward movement gate 148.

A first rotatable member 152 is rotatably supported by a first support pin 151 on the vehicle body frame 20. The first rotatable member 152 has a support part 152a and a first lever part 152b. The support part 152a is attached to the first support pin 151. One end of the third wire 134 is coupled to the first lever part 152b.

The base of the second operating element 141 is attached to the support part 152a via a second support pin 154 which extends in a direction orthogonal to the first support pin 151. A second lever 155 serving as a second rotatable member extends from a side opposite the first support pin 151 of the base of the second operating element 141. One end of the second cable 135 is coupled to the tip of the second lever 155 via a ball plunger 156.

A guide part 142 extending in a direction orthogonal to the direction in which the parking gate 144 extends is formed in the hole 138. When the second operating element 141 is positioned at the guide part 142, the second operating element 141 can be rotated around a first rotating shaft 158 which also serves as the central axis of the first support pin 151. When the second operating element 141 is rotated around the central axis of the first support pin 151, the third wire 134 is pulled, and switching corresponding to the traveling mode is performed by the transmission 120 (see FIG. 4). On the other hand, when the second operating element 141 reaches the corner part 143, the second operating element 141 reaches the inlet to the parking gate 144.

A torsion spring 167 is attached to the second support pin 154. The second operating element 141 is biased in a direction moving away from the corner part 143 by the torsion spring 167. Due to the biasing action of the torsion spring 167, the second operating element 141 is pressed back into one of the parking gate 144, the reverse movement gate 145, the neutral gate 146, the high-speed forward movement gate 147, or the low-speed forward movement gate 148.

When the second operating element 141 is positioned at the corner part 143, the second operating element 141 can rotate around a second rotating shaft 159, which also serves as the central axis of the second support pin 154. In addition, when the second lever 155 rotates around the second rotating shaft 159, the support part 152a is stopped, so there is no effect on the traveling mode.

The movement of each member caused by operating the second operating element 141 to establish a parking state will be described hereinafter.

First, when the second operating element 141 is moved to the corner part 143 along the guide part 142, the first rotatable member 152 rotates, and the third wire 134 is pulled. As a result, the rotation of each of the front side propeller shaft 14f and the rear side propeller shaft 14r is restricted by the transmission 120 (see FIG. 4), and the transmission of power is blocked (blocked state).

Next, when the second operating element 141 is moved from the corner part 143 to the parking gate 144 side, the second lever 155 rotates and the second cable 135 is pulled. As a result, the slide member 191 (see FIG. 4) is activated so that the rear side duff-lock mechanism 190 (see FIG. 4) enters a locked state (state in which the diff-lock is turned on).

Accordingly, by moving the second operating element 141 to the interior of the parking gate 144, it is possible to turn the transmission 120 on (blocked state) and to set the rear side diff-lock mechanism 190 to the locked state. In this way, the operations of the transmission 120 and the rear side diff-lock mechanism 190 are performed by the single second operating element 141.

The details of the rear side differential 15r to which the rear side diff-lock mechanism 190 is attached will be described hereinafter.

Figure 6:
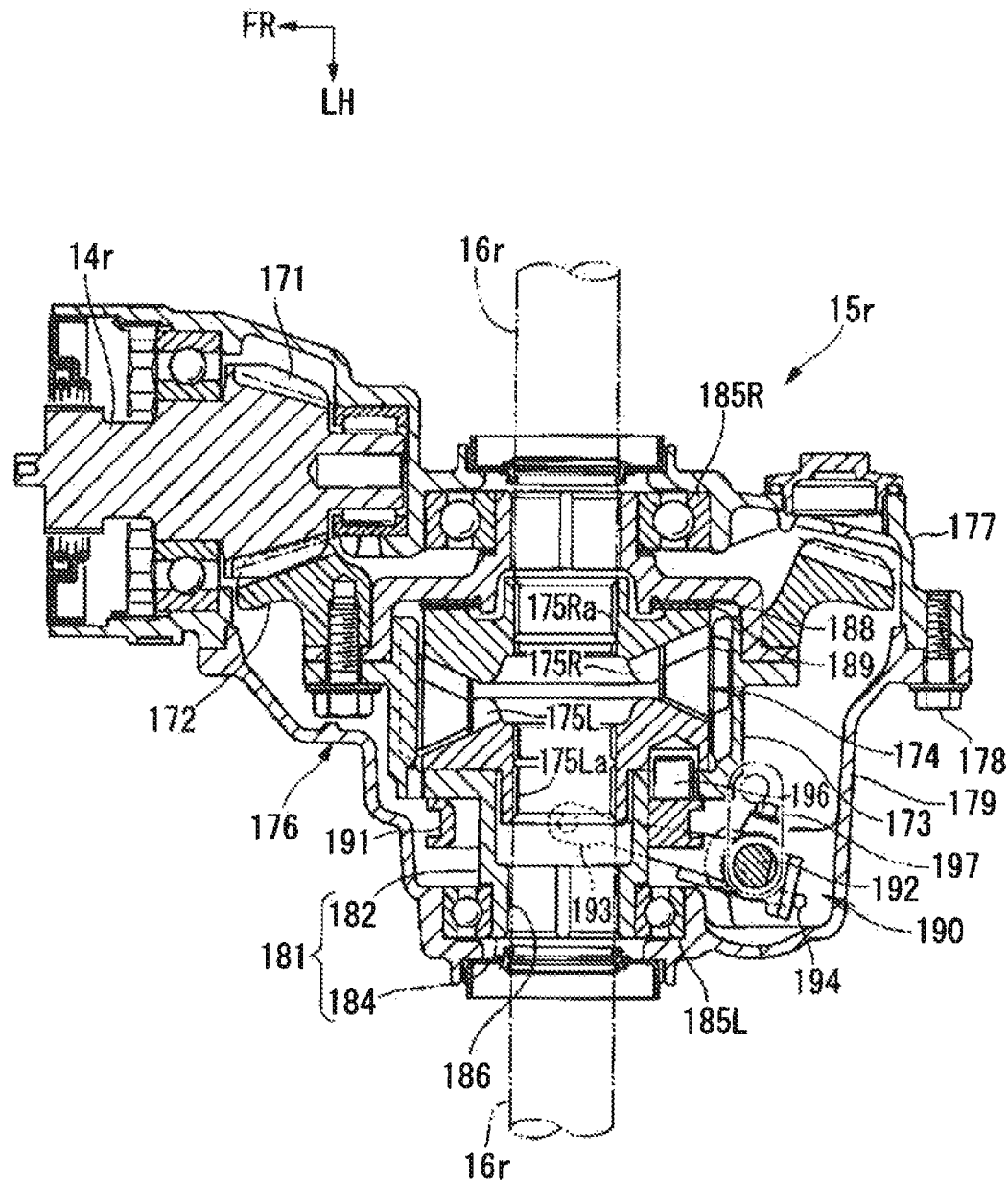
FIG. 6 is a plan cross-sectional view of the differential of the vehicle.

As illustrated in FIG. 6, the rear side differential 15r is provided with a pinion gear 171, ring gear 172, a differential case 173, a differential mechanism 174, left and right output side cams 175L and 175R, and a gear case 176.

The pinion gear 171 is provided on the rear end of the rear side propeller shaft 14r.

The ring gear 172 engages with the pinion gear 171.

The differential case 173 rotates in accordance with the ring gear 172 so as to form a differential chamber.

The differential mechanism 174 is housed in the differential case 173 and can set the rotational speed difference of the left and right rear wheels RW.

The left and right output side cams 175L and 175R are disposed as a pair on both the left and right sides in the vehicle width direction and constitute a part of the differential mechanism 174. The left and right output side cams 175L and 175R transmit the power transmitted to the ring gear 172 to the rear side drive shaft 16r.

The gear case 176 houses the ring gear 172 and the differential case 173.

A washer 188 and a disc spring 189 are provided between the ring gear 172 and the right output side cam 175R. The right output side cam 175R is biased toward the side of the left output side cam 175L.

The left output side cam 175L is provided with a spline groove 175La. The inside part in the vehicle width direction of the left side part in the vehicle width direction of the rear side drive shaft 16*r* is fitted into the spline groove 175L*a*.

The gear case 176 has a first case half-body and a second case half-body 179.

The first case half-body 177 rotatably supports the pinion gear 171.

The second case half-body 179 is coupled to the first case half-body 177 by a bolt 178. The rear side diff-lock mechanism 190 is housed in the second case half-body 179.

The gear case 176 is provided with a pair of left and right bearings 185I, and 185R on both sides in the vehicle width direction. The differential case 173 is rotatably attached to the gear case 176 by the left and right bearings 185L and 185R. The left side in the vehicle width direction of the differential case 173 is formed into a cylindrical shaft 181. The cylindrical shaft 181 has a large-diameter part 182 and a small-diameter part 184 with a smaller diameter than the large-diameter part 182. The small-diameter part 184 is connected to the left end in the vehicle width direction of the large-diameter part 182. The small-diameter part 184 is supported by the gear case 176 via the bearing 185L.

The slide member 191 constituting the rear side diff-lock mechanism 190 is fitted so as to be freely movable in the axial direction of the large-diameter part 182.

A rotating shaft 192 that is rotatable with respect to the second case half-body 179 is attached in the vicinity of the bearing 185L. An arm 197 (switch) is attached to one end of the rotating shaft 192. A shift fork 193 is attached to roughly the center of the axial direction of the rotating shaft 192. The shift fork 193 is fitted onto the slide member 191.

A torsion spring 194 is provided in the second case half-body 179. The rotating shaft 192 is biased clockwise in FIG. 6 by the torsion spring 194. As a result, the shift fork 193 slides the slide member 191 to the differential case 173 side. This causes a pin 196 provided in the slide member 191 to engage with the left output side cam 175L. As a result, the rotation of the left output side cam 175L is prevented by the pin 196, and the differential mechanism 174 enters the non-differential state—that is, the diff-lock state (state in which the diff-lock is turned on).

Unless an external force is applied to the rotating shaft 192, the diff-lock state is constantly maintained by the action of the torsion spring 194.

When the arm 197 is swung counterclockwise in FIG. 6 by an external force, the rotating shaft 192 rotates, and the shift fork 193 swings such that the slide member 191 moves in a direction of moving away from the differential case 173, and the pin 196 is removed from the left output side cam 175*f*. As a result, the left output side cam 175L becomes able to rotate, and the differential mechanism 174 enters the differential motion state—that is, the differential state (state in which the diff-lock is turned off).

The details of the mechanism for swinging the arm 197 are described hereinafter.

Figure 7:
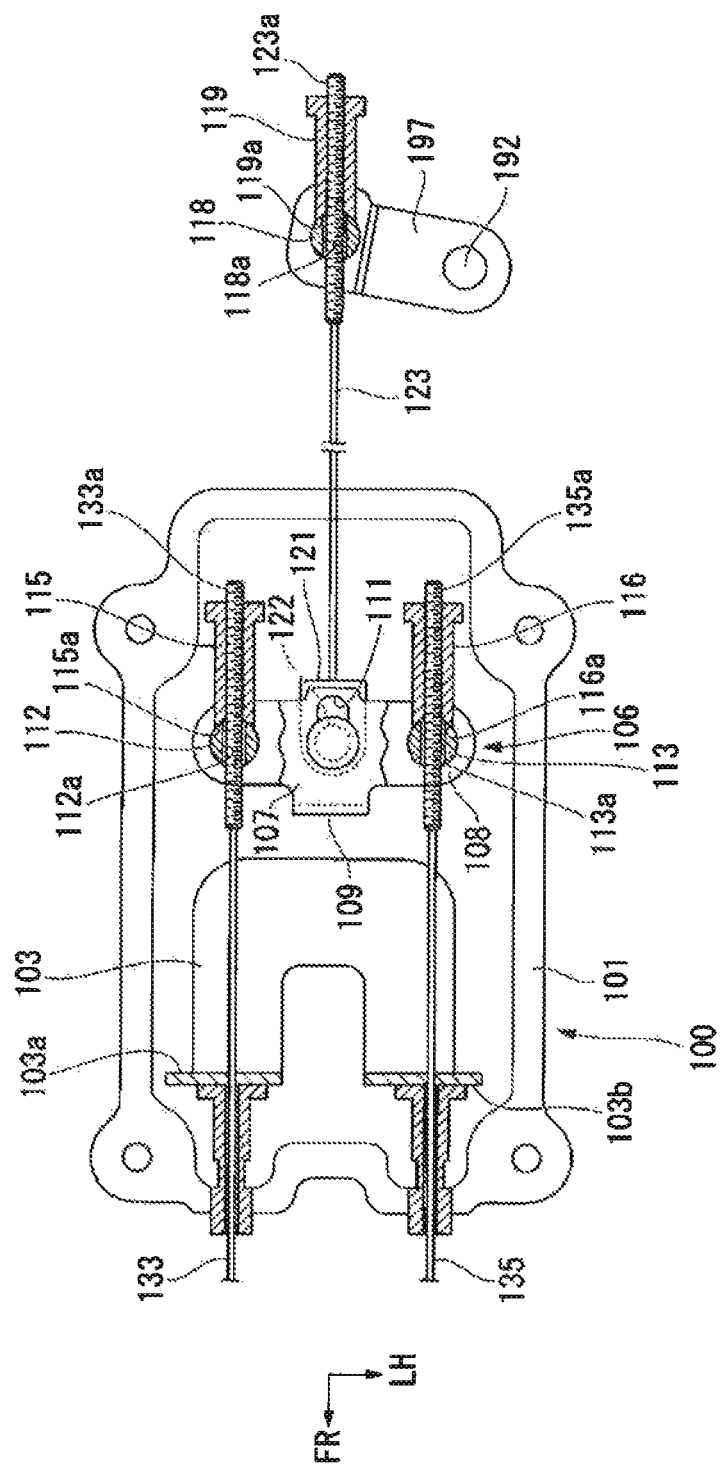

As illustrated in FIG. 7, one end of the rotating shaft 192 projects to the outside from the second case half-body 179. The arm 197 is attached to the one projecting end of the rotating shaft 192.

Figure 14:
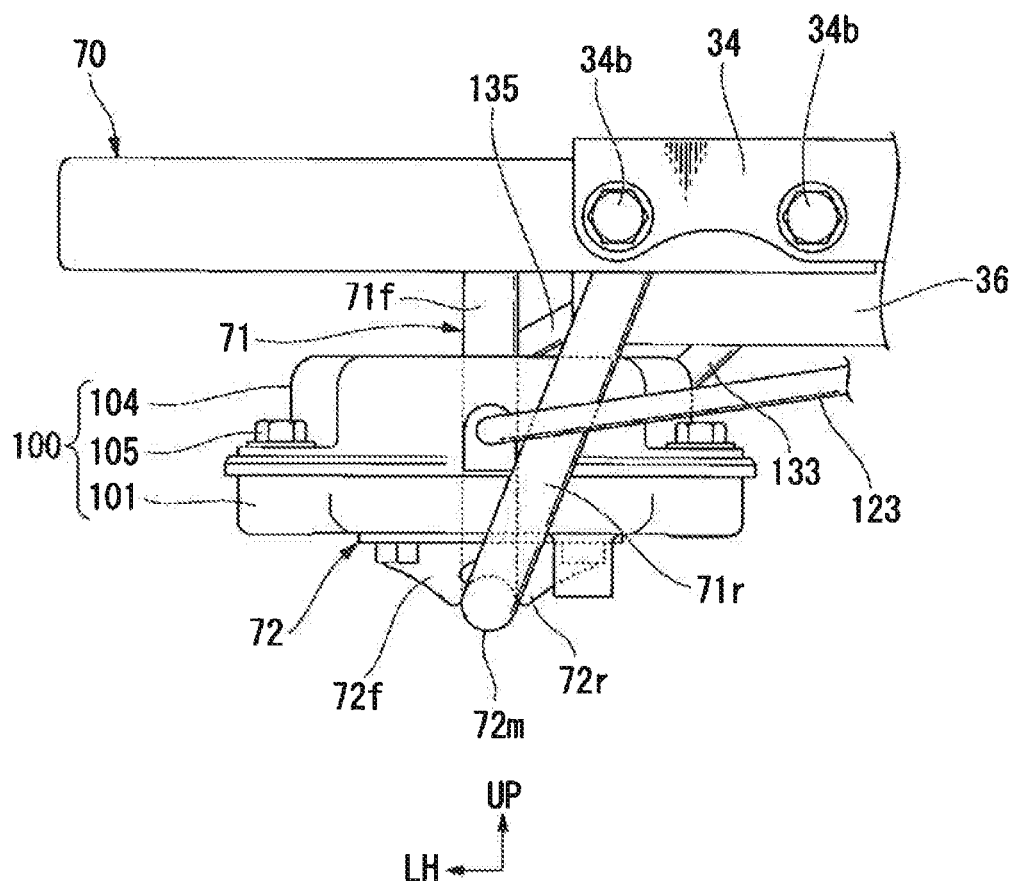
FIG. 14 is a rear view illustrating the arrangement of the assembly member of the vehicle.

Referring to FIGS. 7 and 14, the case 100 has a case main body 101, a lid 104, and a bolt 105. The case main body 101 is covered by the lid 104. The lid 104 is fixed to the case main body 101 by the bolt 105.

As illustrated in FIG. 7, a cable stay 103 is a pressed product made of metal, for example, and has a first wall 103*a* and a second wall 103*b*.

The first wall 103*a* supports and guides the first cable 133. The second wall 103*b* supports and guides the second cable 135. An assembly member 106 is housed in the case main body 101 together with the cable stay 103. The assembly member 106 may also sometimes be referred to as a selector mechanism, as it may be used in the selection of the traveling mode of the vehicle, such as between park, reverse, neutral, high and low modes, four-wheel drive, two-wheel drive, and differential lock on or off.

The assembly member 106 is a pressed product made of metal, for example, and has an upper plate part 107, a lower plate part 108, and a bridge part 109. In FIG. 7, both the left and right ends in the vehicle width direction of the upper plate part 107 are omitted for the sake of convenience in order to make it easier to see the lower plate part 108.

The upper plate part 107 and the lower plate part 108 respectively form an I-shape when viewed from above. A long hole 111 is formed in each of the forward/backward and left/right central parts of the upper plate part 107 and the lower plate part 108.

The bridge part 109 is a portion which connects the respective central front parts in the vehicle width direction of the upper plate part 107 and the lower plate part 108. The assembly member 106 is provided with a first piece 112 and a second piece 113.

The first piece 112 is between the upper plate part 107 and the lower plate part 108 and is disposed on the right side in the vehicle width direction while sandwiching the long hole 111. The first piece 112 is a cylindrical member having a hole 112*a* through which the first cable 133 passes.

A male screw part 133*a* is formed at the rear end of the first cable 133. A first adjuster 115 is screwed onto the male screw part 133*a*.

An arc-shaped notched surface 115*a* is formed at the front end of the first adjuster 115. The notched surface 115*a* of the first adjuster 115 comes into contact with the first piece 112 so as to prevent the rotation of the first adjuster 115. The length of the first cable 133 can be adjusted by rotating the first adjuster 115 in 180° units.

The second piece 113 is between the upper plate part 107 and the lower plate part 108 and is disposed on the left side in the vehicle width direction while sandwiching the long hole 111. The second piece 113 is a cylindrical member having a hole 113*a* through which the second cable 135 passes.

A male screw part 135*a* is formed at the rear end of the second cable 135. A second adjuster 116 is screwed onto the male screw part 135*a*.

An arc-shaped notched surface 116*a* is formed at the tip of the second adjuster 116. The notched surface 116*a* of the second adjuster 116 comes into contact with the second piece 113 so as to prevent the rotation of the second adjuster 116. The length of the second cable 135 can be adjusted by rotating the second adjuster 116 in 180° units.

A slider pin 122 which extends from a slider 121 is movably attached to the long hole 111 of the assembly member 106. One end of a third cable 123 (device side transmission member) is attached to the slider 121. The third cable 123 extends backward in the forward and backward direction of the vehicle.

The arm 197 is provided with a third piece 118 and a third adjuster 119.

The third piece 118 is a cylindrical member having a hole 118*a* through which the third cable 123 passes. A male screw part 123*a* is formed on the other end of the third cable 123. A third adjuster 119 is screwed onto the male screw part 123*a*.

An arc-shaped notched surface 119*a* is formed at the tip of the third adjuster 119. The notched surface 119*a* of the third adjuster 119 comes into contact with the third piece 118 so as to prevent the rotation of the third adjuster 119. The length of the third cable 123 can be adjusted by rotating the third adjuster 119 in 180° units.

The operation of the assembly member 106 will be described hereinafter with reference to FIGS. 5 and 7.

When the first operating element 127 is moved to the posture illustrated in FIG. 5, the first cable 133 is slackened. On the other hand, when the second operating element 141 is moved to the back of the parking gate 144, the second cable 135 is slackened. When the first cable 133 and the second cable 135 are respectively slackened, they assume the form illustrated in FIG. 7.

In addition, in FIG. 5, when only the first operating element 127 is moved to the right side in the drawing, the first cable 135 is pulled. At this time, the second cable 135 remains in a slackened state. As a result, when the first cable 133 is pulled, the assembly member 106 rotates counterclockwise in FIG. 7 using the second piece 113 as a center of rotation. Consequently, the long hole 111 moves such that the slider pin 122 moves to the arm 197 side end of the long hole 111. At this time, the slider pin 122 only moves within the range of the long hole 111, so the arm 197 does not yet swing.

Alternatively, in FIG. 5, when only the second operating element 141 is moved to the right side in the drawing, the second cable 135 is pulled. At this time, the first cable 133 remains in a slackened state. As a result, the assembly member 106 rotates clockwise in FIG. 7 using the first piece 112 as a center of rotation. Consequently, the long hole 111 moves so that the slider pin 122 moves to the arm 197 side tip of the long hole 111. At this time, the slider pin 122 only moves within the range of the long hole 111, so the arm 197 does not yet swing.

In this way, even if only one of the first operating element 127 or the second operating element 141 is moved and only one of the first cable 133 or the second cable 135 is pulled, the arm 197 does not swing.

On the other hand, in FIG. 5, when the first operating element 127 and the second operating element 141 are respectively moved to the right side in the drawing, the first cable 133 and the second cable 135 are respectively pulled. As a result, the assembly member 106 causes the arm 197 to swing via the third cable 123 by respectively pulling the first cable 133 and the second cable 135. Consequently, the pin 196 illustrated in FIG. 6 is removed from the left output side earn 175L, and the differential mechanism 174 enters the differential motion state (differential state).

Figure 8:
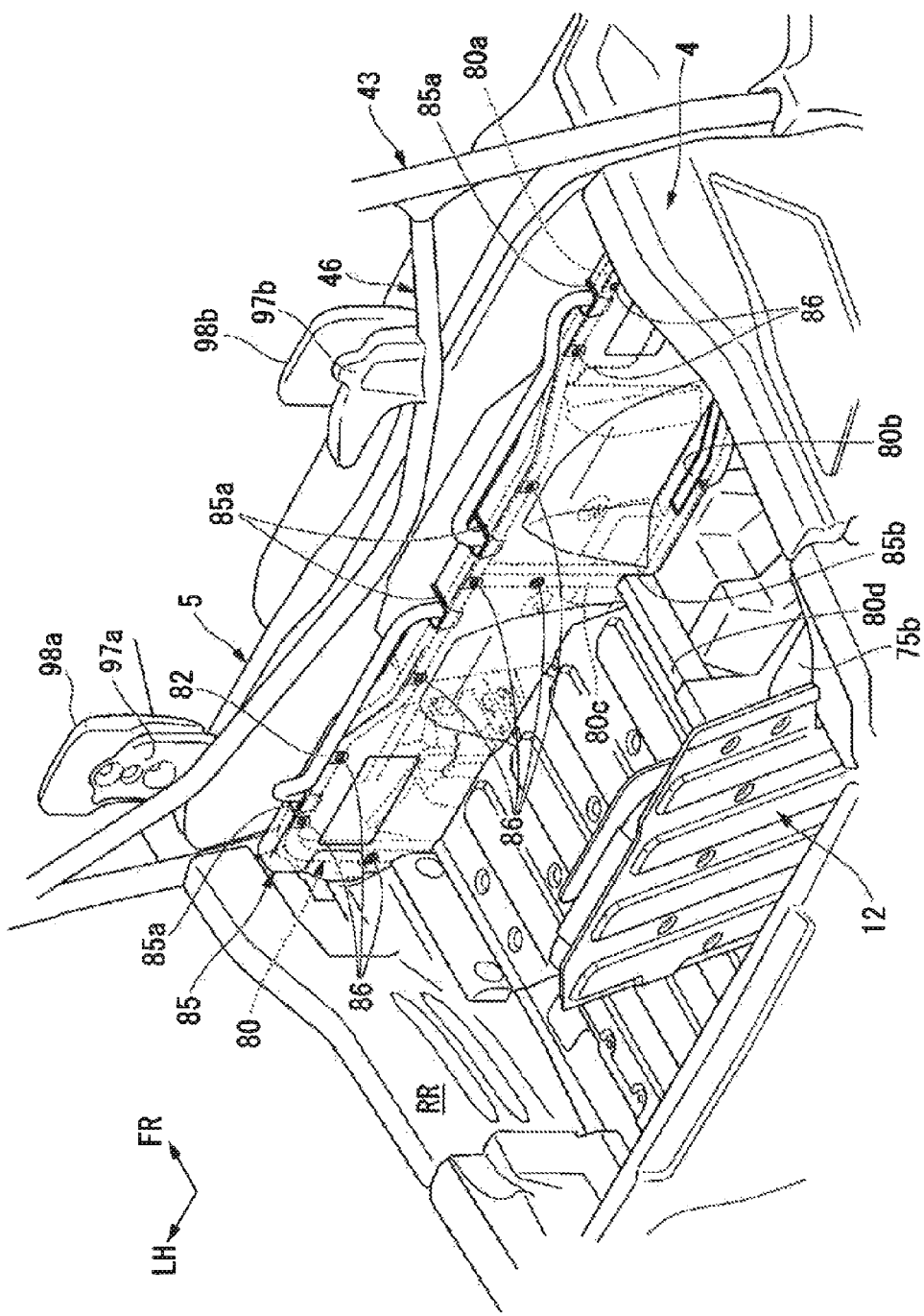
FIG. 8 is a perspective view of a state in which one floorboard is removed from the back seat of the vehicle when viewed from the upper back right.
Figure 11:
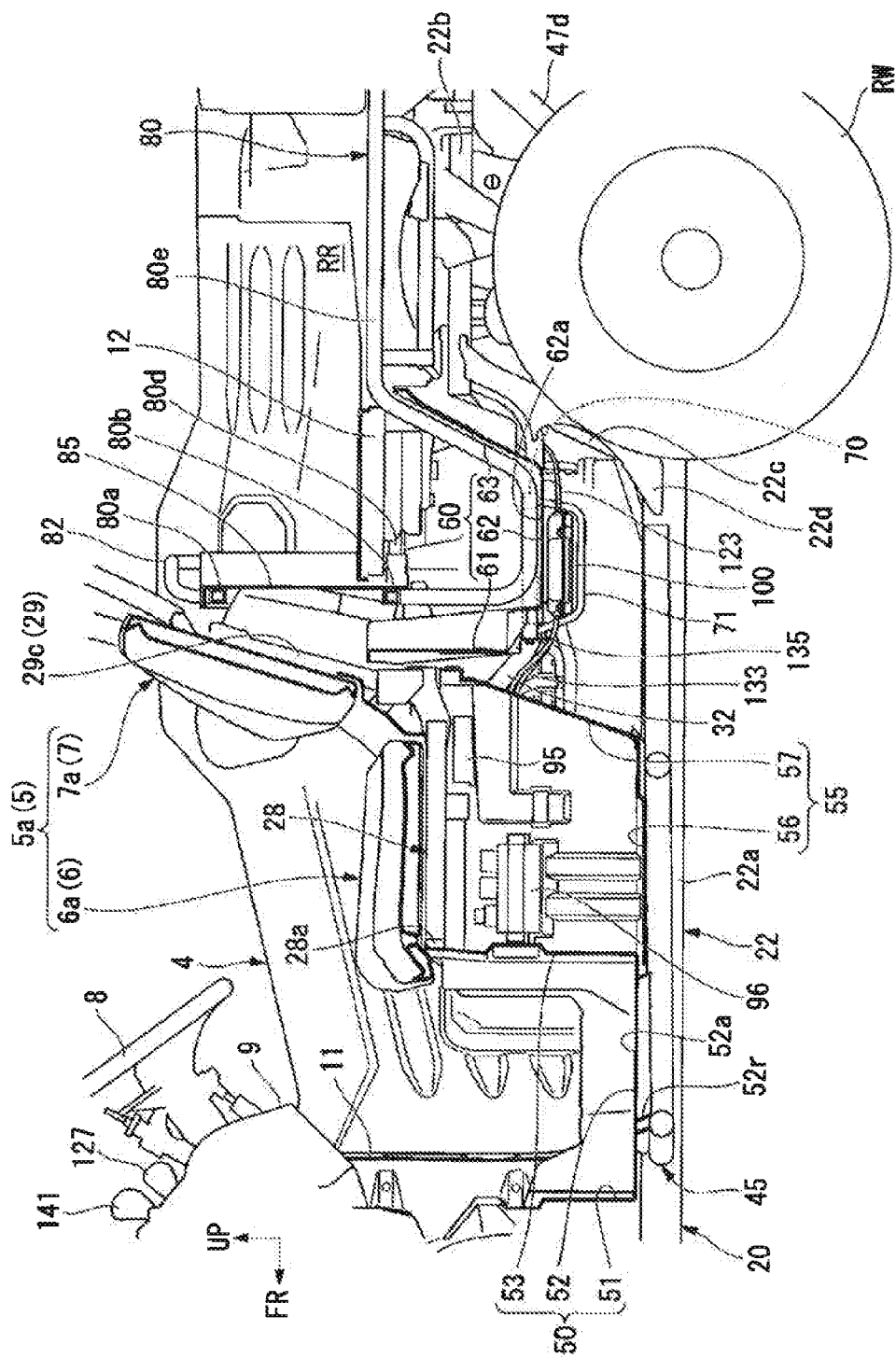
FIG. 11 illustrates the arrangement of the assembly member of the vehicle in a cross-sectional view along line I-I in FIG. 3.

Referring to FIGS. 8 and 11, a rear space RR serving as a trunk or a rear riding space is formed behind the seats 5. FIG. 8 illustrates a state in which the seat 75h in which a second rear passenger Rp2 (see FIG. 1) sits is exposed by opening the floorboard 12 on the right side in the vehicle width direction. In FIGS. 8 and 11, the floorboard 12 on the left side in the vehicle width direction is closed.

A rear floor frame 80 is provided on the rear part of the sub-frame 30 (see FIG. 2).

The rear floor frame 80 has an upper cross part 80a, a lower cross part 80b, coupling parts 80c, a center part 80d, and a pair of left and right side parts 80e.

The upper cross part 80a extends to the left and right while forming a rectangular cross-sectional shape. The central part in the vehicle width direction of the upper cross part 80a forms a convex curved shape in the rearward direction.

The lower cross part 80b extends to the left and right beneath the upper cross part 80a while forming a rectangular cross-sectional shape. The central part in the vehicle width direction of the lower cross part 80b forms a convex curved shape in the rearward direction.

The coupling parts 80c are respectively disposed on both sides in the vehicle width direction and in the center in the vehicle width direction. The left, right, and center coupling parts 80c extend vertically while forming a rectangular cross-sectional shape so as to link the vertical space between the upper cross part 80a and the lower cross part 80b.

The center part 80d forms a rectangular cross-sectional shape and extends linearly in the rearward direction starting from the connection part of the lower cross part 80b and the center coupling part 80c.

The left and right side parts 80e form a rectangular cross-sectional shape and extend linearly in the rearward direction starting from the connection part of the lower cross part 80b and the left and right coupling parts 80c. Specifically, in FIG. 11, the left and right side parts 80e extend linearly downward starting from the connection part with the lower cross part 80b (left and right coupling parts 80c) and then bend rearward and extend linearly from in front of the area of an overlap with the rear parts 32b of the left and right upper sub-side frames 32 (see FIG. 2). The left and right side parts 80e then bend up and rearward and extend linearly from in front of the area of overlap with the stepped parts 22c of the left and right side frames 22 and then bend backward and extend linearly.

The upper cross part 80a, the lower cross part 80b, and the left, right, and center coupling parts 80c of the rear floor frame 80 are covered by a cover 85. The cover 85 is fastened and fixed to the rear floor frame 80 by a plurality of bolts 86.

The cover 85 forms a rectangular shape extending to the left and right in the vehicle width direction. A plurality (for example, four in this embodiment) of first openings 85a, which open upward and downward, are formed in the upper part of the cover 85 with prescribed spaces between the openings in the vehicle width direction.

A pair of left and right handles 82 are provided on both sides in the vehicle width direction at the upper cross part 80a of the rear floor frame 80.

The left and right handles 82 extend to the left and right while forming a circular cross-sectional shape. The left and right ends of the left and right handles 82 pass through the first openings 85a of the cover 85 and are coupled to the upper cross part 80a of the rear floor frame 80.

In this way, by providing the left and right handles 82, the rear passengers Rp1 and Rp2 (see FIG. 1) can grip the left and right handles 82 when riding in the seats that are exposed by opening the floorboard 12, which makes it possible to stabilize their upper bodies.

(Arrangement for an Assembly Member of a Vehicle)

As illustrated in FIG. 3, the rear side propeller shaft 14r extends in the forward and backward direction of the vehicle across the center in the vehicle width direction or in the vicinity thereof between the central part between the left and right rear wheels RW and the driving device 13. An exhaust pipe 90 is connected to the driving device 13.

The exhaust pipe 90 is disposed on the right side in the vehicle width direction with respect to the rear propeller shaft 14r. A muffler 92 extending in the vehicle width direction is provided at the upper back of the rear side differential 15r. The exhaust pipe 90 extends backward starting at the forward/backward central part on the right side of the driving device 13 when viewed from above, and then bends inward in the vehicle width direction and extends backward to reach the muffler 92. The exhaust pipe 90 then extends backward to the right through the muffler 92. The portion of the exhaust pipe 90 between the driving device 13 and the muffler 92 is covered by a cover 91. The exhaust pipe 90 feeds exhaust gas from the driving device 13 in the backward direction and releases the exhaust gas through the muffler 92.

The case 100 housing the assembly member 106 is disposed on the side opposite side where the exhaust pipe 90 is disposed while sandwiching the rear side propeller shaft 14r—that is, on the left side in the vehicle width direction while sandwiching the rear side propeller shaft 14r. The case 100 is disposed beneath a rear floor 60 described below. The case 100 is disposed behind and to the left of the driving device 13 and to the front right of the rear side differential 15r.

As illustrated in FIG. 11, the seats 5 have a seat cushion 6 and a seat back 7.

Figure 9:
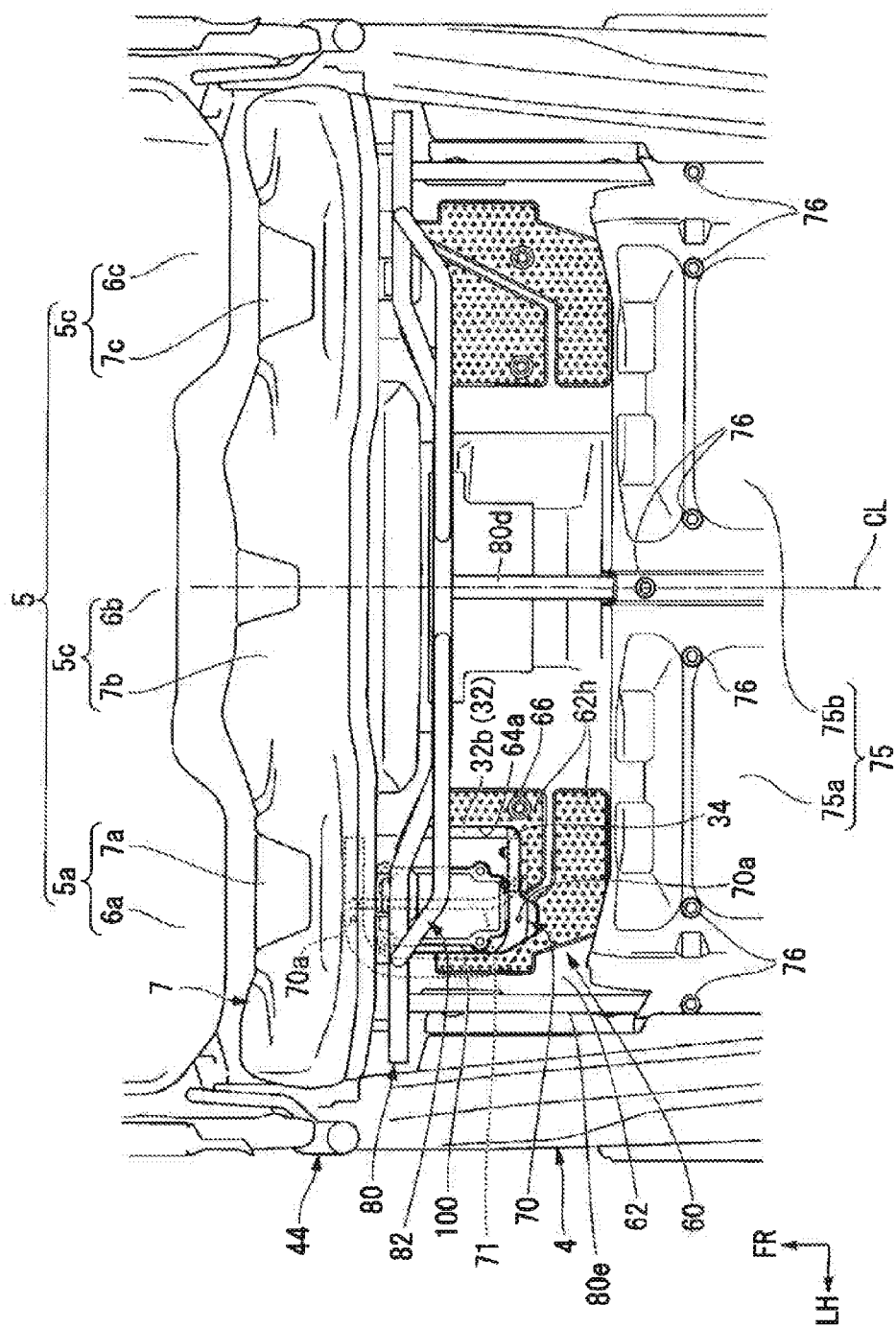
FIG. 9 is a top view of a state in which the lid is removed from the rear floor of the back seat.
Figure 10:
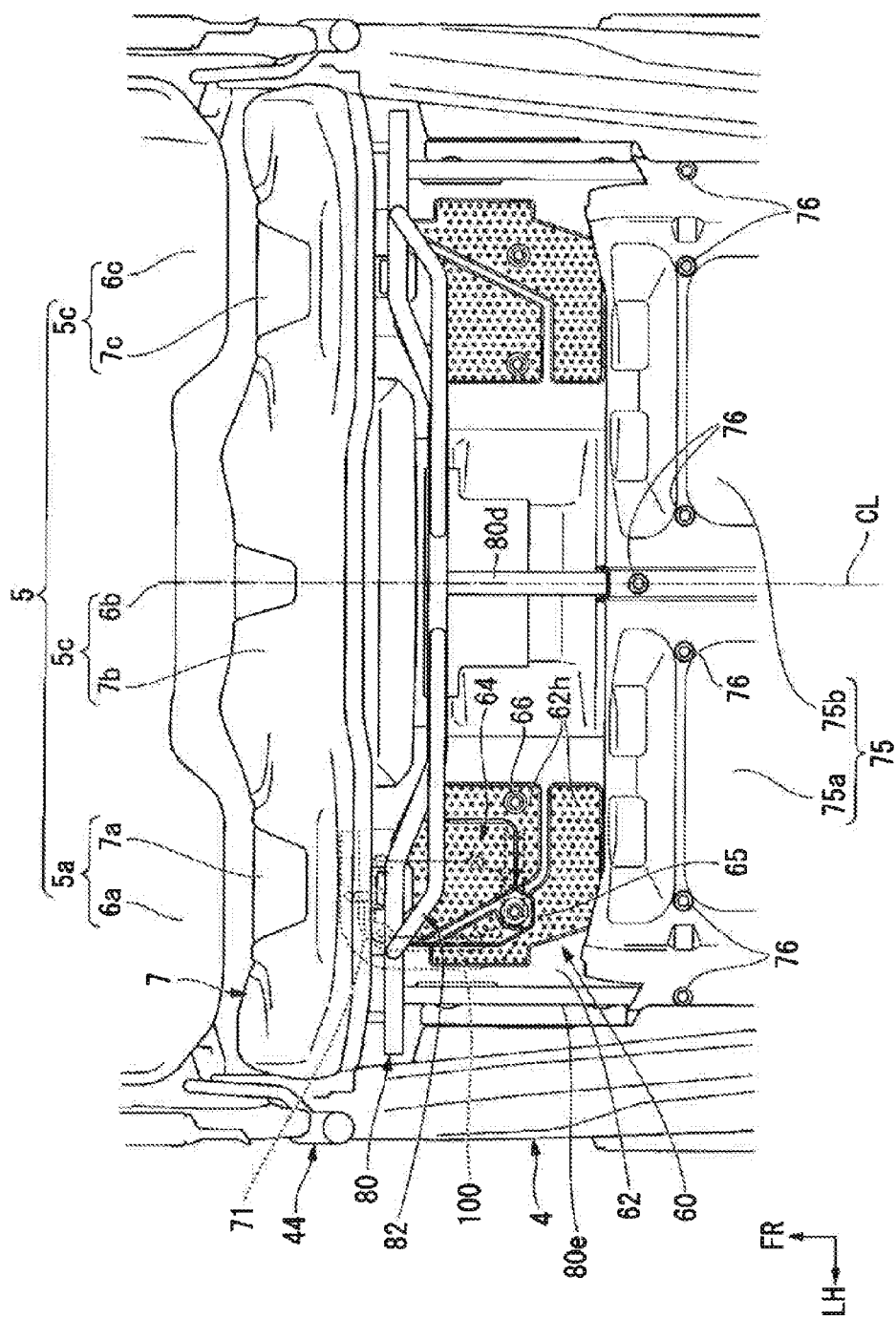
FIG. 10 is a top view of a state in which the lid is attached to the rear floor of the back seat.

Referring to FIGS. 9 and 10, the seats 5 have a plurality (for example, three in this embodiment) of adjacent seats 5a, 5b, and 5c (front seats) aligned in the vehicle width direction.

The seat 5a on the left side in the vehicle width direction is the seat of the driver Dr (see FIG. 1).

The seat 5b in the center in the vehicle width direction is the seat of a first passenger Fp1 sitting adjacently to the right of the driver Dr (see FIG. 1).

The seat 5c on the right side in the vehicle width direction is an adjacent seat to the right of the first passenger Fp1—that is, the seat of a second passenger (see FIG. 1) on the side opposite the side of the seat 5a of the driver Dr when viewed from the perspective of the first passenger Fp1.

The seat cushion 6 has a plurality (for example, three in this embodiment) of adjacent seat bodies (a first seat body 6a, a second seat body 6b, and a third seat body 6c) arranged in the vehicle width direction.

The first seat body 6a is the seat body on which the driver Dr (see FIG. 1) sits and is positioned on the left side in the vehicle width direction.

The second seat body 6b is the seat body on which the first passenger Fp1 (see FIG. 1) sits and is positioned in the center in the vehicle width direction.

The third seat body 6c is the seat body on which the second passenger Fp2 (see FIG. 2) sits and is positioned on the right side in the vehicle width direction.

The seat cushion is supported on and fixed to the seat cushion frame 28 (see FIG. 11). The seat back 7 has a first back 7a, a second back 7b, and third back 7c.

The first back 7a is the back against which the driver Dr (see FIG. 1) leans and is positioned on the left side in the vehicle width direction.

The second back 7b is the back against which the first passenger Fp1 (see FIG. 1) leans and is positioned in the center in the vehicle width direction.

The third back 7c is the back against which the second passenger Fp2 (see FIG. 2) leans and is positioned on the right side in the vehicle width direction.

The seat back 7 is supported and fixed by the cross part 29a and the support part 29b of the seat back frame 29 (see FIG. 3) and the pair of left and right coupling parts 29c.

As illustrated in FIG. 11, the front floor 50 is provided in front of the front seats 5a, 5b, and 5c. The front floor 50 extends in the vehicle width direction so that each of the front occupants Dr, Fp1, and Fp2 (the driver Dr, the first passenger Fp1, and the second passenger Fp2 illustrated in FIG. 1) sitting in a row in the vehicle width direction can rest their feet. The front and rear ends in the forward and backward direction of the vehicle and the left and right ends in the vehicle width direction of the front floor 50 are respectively supported by the body 2 (see FIG. 1).

The front floor 50 has a front wall part 51, a main body part 52, and a rear wall part 53.

The front floor 50 has a cross-sectional U-shape in which the central part between the front and back projects downward. Specifically, in FIG. 11, the front floor 50 forms a convex projecting part facing forward starting from the vertical central part of the front wall part 51 and extends linearly downward so as to reach the front end of the main body part 52. The front floor 50 then extends linearly backward so as to reach the front end of the rear wall part 53, and then extends linearly upward so as to form a convex projecting part facing backward. The front floor 50 then extends diagonally backward and upward so as to reach the upper end of the rear wall part 53.

The upper end of the front wall part 51 is fixed to the lower end of the instrument panel 9. The left and right ends in the vehicle width direction of the front wall part 51 are fixed to the rear ends of the left and right front fenders 11.

The left and right ends in the vehicle width direction of the main body part 52 are supported by the left and right lower parts 40a of the left and right side roll bars 4 (see FIG. 2).

The upper end of the rear wall part 53 is fixed to the main body part 28a of the seat cushion frame 28. The left and right ends in the vehicle width direction of the rear wall part 53 are fixed to a vertical extension part (not illustrated) which connects the main body part 28a of the seat cushion frame 28 and the left and right coupling parts 45c of the lower roll bar 45 (see FIG. 3).

A footrest surface 52a on which the front occupants Dr, Fp1, and Fp2 may rest their feet is formed on the upper surface of the main body part 52.

A plurality of ribs 52r are formed on the lower surface of the main body part 52 with prescribed spaces between the ribs in the forward and backward direction of the vehicle. Each rib 52r extends diagonally backward and downward from the lower surface of the main body part 52.

Referring to FIGS. 9 and 10, a back seat 75 is provided behind the front seats 5a, 5b, and 5c. The back seat 75 has a plurality (for example, two in this embodiment) of adjacent seats 75a and 75b arranged in the vehicle width direction.

The seat 75a on the left side in the vehicle width direction is the seat of a first rear passenger Rp1 (see FIG. 1).

The seat 75b on the right side in the vehicle width direction is the seat of a second rear passenger Rp2 (see FIG. 1) sitting adjacent to the right of the first rear passenger Rp1.

The back seat 75 is fastened and fixed to the rear floor frame 80 or the like by a plurality of bolts 76.

A rear floor 60 on which the rear passengers Rp1 and Rp2 may rest their feet is provided between the front seats 5a, 5b, and 5c and the back seat 75. The rear floor 60 extends in the vehicle width direction so that each of the rear passengers Rp1 and Rp2 can rest their feet. The front and rear ends in the forward and backward direction of the vehicle and the left and right ends in the vehicle width direction of the rear floor 60 are respectively supported by the body 2 (see FIG. 1).

As illustrated in FIG. 11, the rear floor 60 has a front wall part 61, a main body part 62, and a rear wall part 63.

The rear floor 60 has a cross-sectional U-shape in which the central part between the front and back projects downward. Specifically, in FIG. 11, the rear floor 60 extends downward starting from the upper end of the front wall part 61 and then bends and extends backward. The rear floor 60 then bends and extends downward so as to reach the front end of the main body part 62, and then extends linearly backward so as to reach the front end of the rear well part 63. The rear floor 60 then extends linearly diagonally backward and upward, and then bends and extends upward so as to reach the upper end of the rear wall part 63.

The main body part 62 is fixed to the rear parts 32b of the left and right upper sub-side frames 32, the second upper cross frame 34, or the like (see FIG. 9). A through-hole 34a (see FIG. 12) opening upward and downward is formed in the second upper cross frame 34. A bolt 66 (see FIG. 9) is passed through the through-hole 34a of the second upper cross frame 34 and is screwed into and fastened to a weld nut (not illustrated) from above the main body part 62 so that the main body part 62 is fastened and fixed to the second upper cross frame 34.

A footrest surface 62a on which the rear passengers Rp1 and Rp2 may rest their feet is formed on the upper surface of the main body part 62.

The height of the footrest surface 62a of the rear floor 60 is greater than the height of the footrest surface 52a of the front floor 50. This is because the main body part 62 of the rear floor 60 is fixed to the rear parts 32b (see FIG. 2) of the left and right upper sub-side frames 32 disposed at a higher position than the left and right lower parts 40a (see FIG. 2) of the left and right side roll bars 40 on which the main body part 52 of the front floor 50 is supported.

In addition, the height of the assembly member 106 is also greater than the height of the footrest surface 52a of the front floor 50. Here, the height of the assembly member 106 refers to the height of the lower surface of the case 100 housing the assembly member 106.

Referring to FIGS. 9 and 10, on the left side in the vehicle width direction of the main body part 62 of the rear floor 60, a plurality of non-slip parts 62h are arranged in a row from front to back in the portion where the first passenger Rp1 rests his feet. An opening 64a (see FIG. 9) through which a part of the main body part 62 passes vertically is formed at a position overlapping the non-slip parts 62 from the front to back of the main body part 62 when viewed from above. A lid 64 (see FIG. 10) is detachably provided over the opening 64a. The lid 64 is provided facing the case 100.

As illustrated in FIG. 9, the case 100 is exposed from the opening 64a in a state in which the lid 64 is removed from the rear floor 60. Since the assembly member 106 (see FIG. 7) is housed inside the case 100, opening the case 100 exposes the assembly member 106 from the opening 64a. On the other hand, as illustrated in FIG. 10, the case is hidden by the lid 64 in a state in which the lid 64 is attached to the rear floor 60.

As illustrated in FIG. 11, a housing member 55 is provided in front of the case 100 and beneath the seat cushion 6.

The housing member 55 forms a cross-sectional L-shape and has a main body part 56 and a rear wall part 57. Specifically, in FIG. 11, the housing member 55 extends linearly backward starting from the front end of the main body part 56, and then bends backward and upward and extends backward so as to reach the lower end of the rear wall part 57.

The housing member 55 then extends linearly diagonally backward and upward and then bends upward in a crank shape so as to reach the upper end of the rear wall part 57. The housing member 55 has roughly the same length in the vehicle width direction as that of the front floor 50 and has roughly the same base height as that of the main body part 52 of the front floor 50. A plurality of electrical components 95 and 96 are housed inside the housing member 55.

Figure 12:
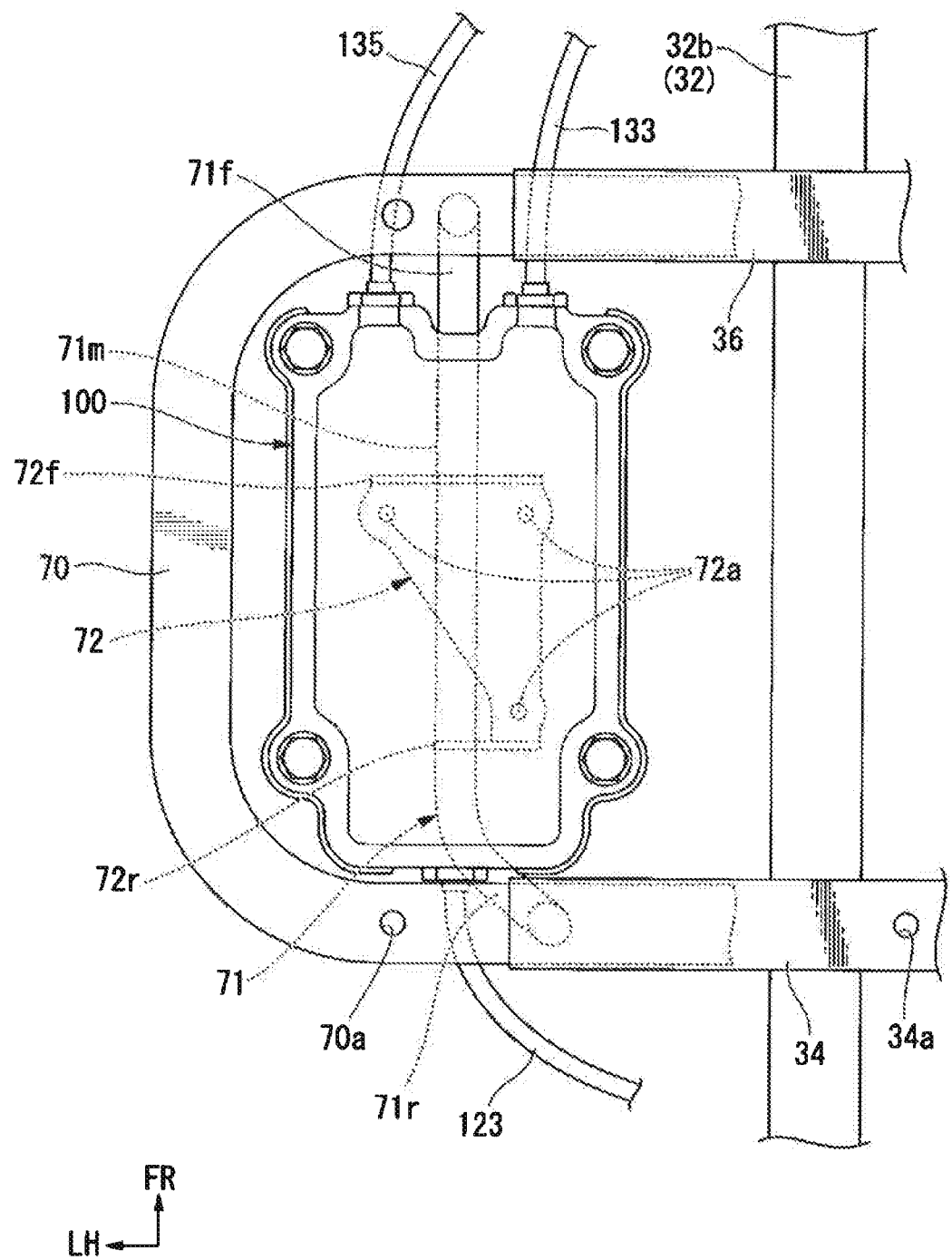
FIG. 12 is a top view illustrating the arrangement of the assembly member of the vehicle.

As illustrated in FIG. 12, a first support member 70 is provided on the left side of the rear parts 32b of the left and right upper sub-side frames 32 so as to follow along the main body part 62 of the rear floor 60. The first support member 70 forms a U-shape opening to the right in the vehicle width direction when viewed from above. The rear right end of the first support member 70 is fastened and fixed to the left end of the second upper cross frame 34 by a plurality of bolts 34b (see FIG. 14) or the like.

A bracket 36 is provided in front of the second upper cross frame 34. The bracket 36 extends in the vehicle width direction, and the right end thereof is fixed to the rear part 32b. The front right end of the first support member 70 is fixed to the left end of the bracket 36. The first support member 70 supports the left side part in the vehicle width direction of the main body part 62 of the rear floor 60.

A plurality (for example, two in this embodiment) of through-holes 70a opening upward and downward are formed in the first support member 70. Referring to FIG. 10, through-holes (not illustrated) are also formed in the lid 64 at positions overlapping the through-holes 70a of the first support member 70. Bolts 65 are passed through the through-holes of the lid 64 and the through-holes 70a of the first support member 70 and are screwed into and fastened from above the lid 64 so that the lid 64 is fastened and fixed to the first support member 70.

Figure 13:
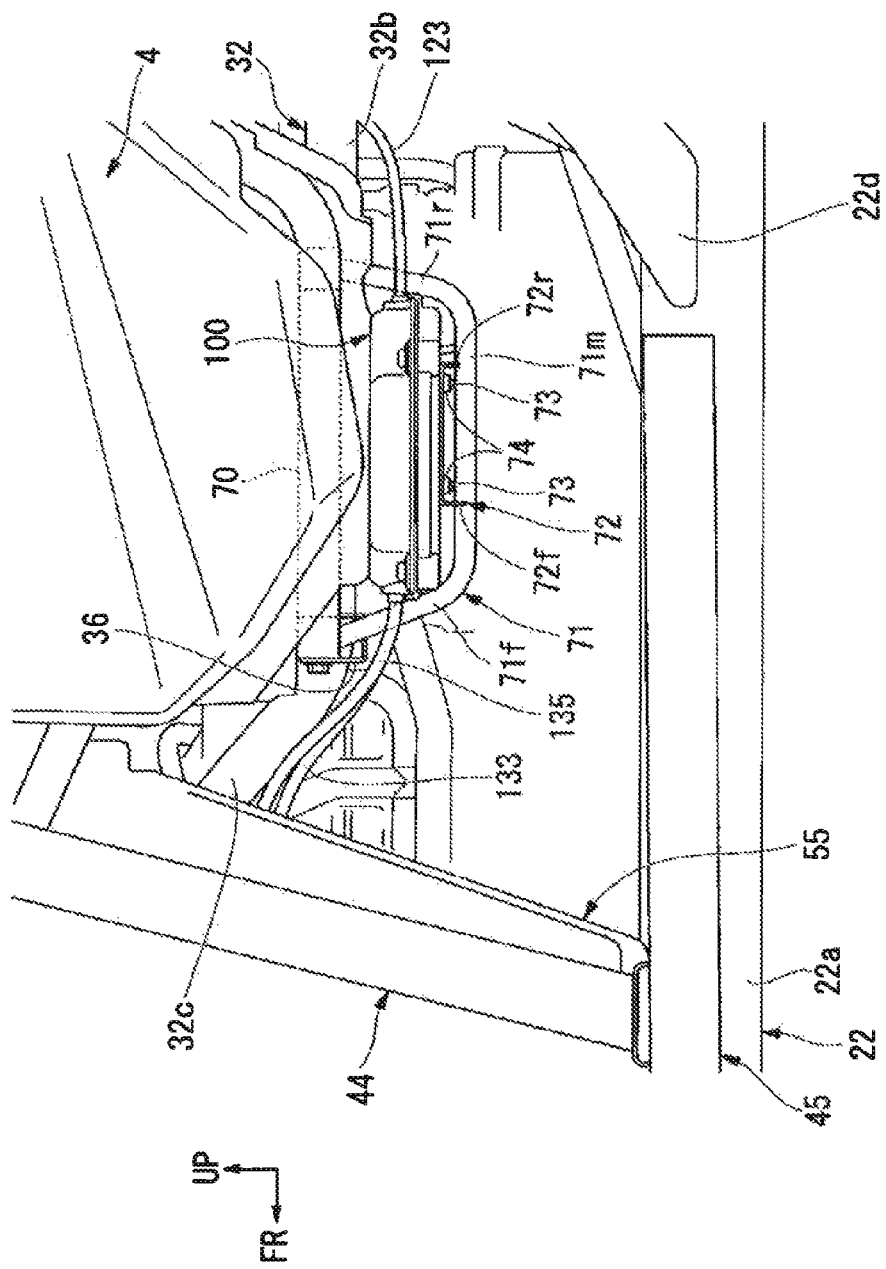
FIG. 13 is a left side view illustrating the arrangement of the assembly member of the vehicle.

Referring to FIG. 13, a second support member 71 is provided beneath the first support member 70. The second support member 71 forms a U-shape opening upward, and both ends are connected to the first support member 70. The case 100 is attached so that the second support member 71 is placed at a central part 71m described below in the direction extending forward and backward in a planar view.

A bracket 72 is provided at the central part 71m of the second support member 71. The bracket 72 has a first projecting part 72f and a second projecting part 72r. The first projecting part 72f is a portion which projects downward from the front end of the bracket 72. The second projecting part 72r is a portion which projects downward from the rear end of the bracket 72. The bracket 72 is fixed to the central part 71m of the second support member 71 by the first projecting part 72f and the second projecting part 72r.

A plurality (for example, three in this embodiment) of through-holes 72a opening upward and downward is formed in the bracket 72. Nuts 74 are screwed onto and fastened to bolts 73 projecting downward from the case 100 through the through-holes 72a of the bracket 72, thereby fastening and fixing the case 100 to the bracket 72.

As illustrated in FIG. 12, the case 100 forms a rectangular shape extending in the forward and backward direction of the vehicle. The first cable 133 and the second cable 135 respectively extend toward the driver's seat 5a (see FIG. 11) from the short edge on the front side of the case 100. The third cable 123 extends toward the rear side differential 15r (see FIG. 3) from the short edge on the rear side of the case 100.

The second support member 71 has a first standing part 71f, a central part 71m, and a second standing part 71r. The first standing part 71f is positioned on the front part of the second support member 71. The central part 71m is positioned at the central part between the top and bottom of the second support member 71. The second standing part 71r is positioned on the rear part of the second support member 71. The central part 71m of the second support member 71 extends in the direction of the long sides of the case 100.

Referring to FIG. 14, the first standing part 71f of the second support member 71 passes between the first cable 133 and the second cable 135, and extends toward the first support member 70. The second standing part 71r of the second support member 71 extends toward the first support member 70 while bending further to the right (inward in the vehicle width direction) than the central part 71m and while avoiding the third cable 123.

In the embodiment described above, an example in which the exhaust pipe 90 is disposed on the right side in the vehicle width direction while sandwiching the rear side propeller shaft 14r was given, but the present disclosure is not limited to this example. For example, the exhaust pipe 90 may also be disposed on the left side in the vehicle width direction while sandwiching the rear side propeller shaft 14r. In this case, the case 100 housing the assembly member 106 is disposed on the right side in the vehicle width direction while sandwiching the rear side propeller shaft 14*r*.

As described above, the above embodiment is an arrangement for an assembly member of a vehicle 1 including: a power unit 13 for generating a driving force; a pair of left and right driving wheels RW disposed on both sides in the vehicle width direction; a propeller shaft 14*r* extending in the forward and backward direction of the vehicle in the center of the vehicle width direction or the vicinity thereof between a central part between the pair of left and right driving wheels RW and the power unit 13; a differential 15*r* to which the propeller shaft 14*r* is connected so as to transmit the driving force to the pair of left and right driving wheels RW via a pair of left and right drive shafts 16*r* disposed on both sides in the vehicle width direction; a switch 197 for switching the diff-lock of the differential 15*r* on and off; an exhaust pipe 90 disposed on one side in the vehicle width direction with respect to the propeller shaft 14*r*; a plurality of operation side transmission members 133 and 135, one end of which is respectively connected to a plurality of operating elements 127 and 141 disposed at a driver's seat 5*a*; a device side transmission member 123, one end of which is connected to the switch 197; and an assembly member 106 to which the other ends of the plurality of operation side transmission members 133 and 135 and the device side transmission member 123 are respectively connected so as to operate the switch 197 via each of the plurality of operation side transmission members 133 and 135 and the device side transmission member 123 with an operating force applied to each of the plurality of operating elements 127 and 141; the assembly member 106 being disposed on the opposite side as the exhaust pipe 90 so as to sandwich the propeller shaft 14*r*.

With this configuration, the assembly member 106 is disposed on the opposite side as the exhaust pipe 90 in the vehicle width direction, so measures for preventing thermal damage become unnecessary. Examples of measures for preventing thermal damage include the selection of an optimal material (resin material or the like) for the assembly member 106, the installation of a heat-resistant cover in addition to a mudguard cover, and the like, but these measures become unnecessary. Therefore, the assembly member 106 can be disposed at an appropriate position in relation to peripheral members.

In addition, the embodiment described above further includes a back seat 75 positioned behind front seats 5*a*, 5*b*, and 5*c* including the driver's seat 5*a*; and a rear floor 60 positioned between the front seats 5*a*, 5*b*, and 5*c* and the back seat 75 so that occupants Rp1 and Rp2 of the back seat 75 may rest their feet on the rear floor 60; wherein the assembly member 106 is disposed beneath the rear floor 60, and a lid 64 enabling the opening/closing or attachment'detachment of at least part of the rear floor 60 is provided on the rear floor 60 facing the assembly member 106. As a result, the lid 64 can be opened/closed or attached/detached at the feet of the occupants Rp1 and Rp2 in the back seat 75, thereby facilitating the adjustment of the cables 133 and 135.

In addition, in the embodiment described above, a front floor 50 on which occupants Dr, Fp1, and Fp2 may rest their feet is provided in front of the front seats 5*a*, 5*b*, and 5*c*, and the height of the footrest surface 62*a* of the rear floor 60 and of the assembly member 106 is greater than the height of the footrest surface 52*a* of the front floor 50. As a result, it becomes difficult for mud to adhere to the rear floor 60 or the assembly member 106 even when mud or the like scatters from a front underneath part of the rear floor 60.

In addition, in the embodiment described above, a front floor 50 on which occupants Dr. Fp1, and Fp2 may rest their feet is provided in front of the front seats 5*a*, 5*b*, and 5*c*, and a housing member 55 having roughly the same length in the vehicle width direction as the front floor (50) and having roughly the same base height as the front floor 50 is provided beneath the front seats 5*a*, 5*b*, and 5*c* in front of the assembly member 106. As a result, the base of the front floor 50 essentially extends to the rear end of the front seats 5*a*, 5*b*, and 5*c* from the perspective of the assembly member 106, so it becomes even more difficult for mud to adhere to the rear floor 60 or the assembly member 106 even when mud or the like scatters from a front underneath part of the rear floor 60.

In addition, the embodiment described above further comprises a first support member 70 provided along the rear floor 60 so as to support the rear floor 60; and a second support member 71 forming an upward-opening U-shape with both ends connected to the first support member 70; wherein the assembly member 106 is attached so as to be placed in the central part 71*m* in the direction in which the second support member 71 extends in a planar view. As a result, even if an impact is sustained from the outside, the impact is input into the second support member 71, so the assembly member 106 sustains practically no impact. Therefore, the assembly member 106 can be protected.

In addition, in the embodiment described above, a case 100 housing the assembly member 106 forms a long rectangular shape in the front-backward direction of the vehicle in a planar view; wherein the plurality of operation side transmission members 133 and 135 are arranged facing the driver's seat 5*a* from one of the short sides of the case 100; the device side transmission member 123 extends toward the differential 15*r* from the other short side of the case 100; the central part 71*m* of the second support member 71 extends in the long side direction of the case 100; a first standing part 71*f* on one side of the second support member 71 passes between the plurality of operation side transmission members 133 and 135 and extends toward the first support member 70; and a second standing part 71*r* on the other side of the second support member 71 extends toward the first support member 70 while avoiding the device side transmission member 123 and while bending further inward in the vehicle width direction than the central part 71*m*. As a result, the arrangement or shape of the second support member 71 is set in relation to the arrangement, shape, or the like of the peripheral members, so the second support member 71 does not impede the respective transmission members 133, 135, and 123, which facilitates the routing of the respective transmission members 133, 135, and 123.

In the present embodiment, an example in which the plurality of operation side transmission members 133 and 135 and the device side transmission member 123 are respectively cables was given, but the present disclosure is not limited to this example. For example, the plurality of operation side transmission members 133 and 135 and the device side transmission member 123 may each be a hose or a rod-shaped member or may be an electrical transmission member having a first terminal corresponding to one end and a second terminal corresponding to the other end. That is, one end of each of the plurality of operation side transmission members 133 and 135 may be connected to each of the plurality of operating elements 127 and 141, while the other end is connected to the assembly member 106, and one end of the device side transmission member 123 may be connected to the switch 197 while the other end is connected to the assembly member 106. The present disclosure is not limited to the embodiment described above. For example, the present disclosure is not limited to a four-wheel vehicle such as that described above and may be applied to various other vehicles such as two-wheel or three-wheel vehicles.

Further, the configuration in the embodiment described above is an example of the present disclosure, and various modifications are possible within a scope that does not depart from the gist of the present disclosure, such as replacing the constituent elements of the embodiment with known constituent elements.

What is claimed is:

1. An arrangement for an assembly member of a vehicle comprising:
   a power unit for generating a driving force;
   a pair of left and right driving wheels disposed on both sides in the vehicle width direction;
   a propeller shaft extending in a forward and backward direction of the vehicle in a vicinity of a center of the vehicle width direction between the pair of left and right driving wheels and the power unit;
   a differential to which the propeller shaft is connected so as to transmit the driving force to the pair of left and right driving wheels via a pair of left and right drive shafts disposed on both sides in the vehicle width direction;
   a switch for switching a diff-lock of the differential on and off;
   an exhaust pipe disposed on one side in the vehicle width direction with respect to the propeller shaft;
   a plurality of operation side transmission members, one end of which is respectively connected to a plurality of operating elements disposed at a driver's seat;
   a device side transmission member, one end of which is connected to the switch; and
   an assembly member to which the other ends of the plurality of operation side transmission members and the device side transmission member are respectively connected so as to operate the switch via each of the plurality of operation side transmission members and the device side transmission member with an operating force applied to each of the plurality of operating elements; the assembly member being disposed on the opposite side of the propeller shaft as the exhaust pipe.

2. The arrangement for an assembly member of a vehicle according to claim 1, further comprising a back seat positioned behind front seats including the drivers seat;
   and a rear floor positioned between the front seats and the back seat so that occupants of the back seat may rest their feet on the rear floor;
   wherein the assembly member is disposed beneath the rear floor; and
   a lid enabling the opening/closing or attachment/detachment of at least part of the rear floor is provided on the rear floor facing the assembly member.

3. The arrangement for an assembly member of a vehicle according to claim 2, wherein a front floor on which occupants may rest their feet is provided in front of the front seats; and the height of the footrest surface of the rear floor and of the assembly member is greater than the height of the footrest surface of the front floor.

4. The arrangement for an assembly member of a vehicle according to claim 2, wherein a front floor on which occupants may rest their feet is provided in front of the front seats; and
   a housing member having roughly the same length in the vehicle width direction as the front floor and having roughly the same base height as the front floor is provided beneath the front seats in front of the assembly member.

5. The arrangement for an assembly member of a vehicle according to claim 2, further comprising a first support member provided along the rear floor so as to support the rear floor; and
   a second support member forming an upward-opening U-shape with both ends connected to the first support member;
   wherein the assembly member is attached so as to be placed in a central part in the direction in which the second support member extends in a planar view.

6. The arrangement for an assembly member of a vehicle according to claim 5, wherein a case housing the assembly member forms a long rectangular shape in the front-backward direction of the vehicle in a planar view;
   the plurality of operation side transmission members are arranged facing the driver's seat from one of the short sides of the case;
   the device side transmission member extends toward the differential from the other short side of the case;
   the central part of the second support member extends in the long side direction of the case;
   a first standing part on one side of the second support member passes between the plurality of operation side transmission members and extends toward the first support member; and
   a second standing part on the other side of the second support member extends toward the first support member while avoiding the device side transmission member and while bending further inward in the vehicle width direction than the central part.

7. An arrangement for an assembly member of a vehicle comprising:
   a propeller shaft extending in a forward and backward direction of the vehicle;
   an exhaust pipe disposed on one side of the propeller shaft;
   an operating element disposed at a driver's seat;
   a transmission member having one end connected to the operating element and another end connected to the assembly member so as to operate with an operating force applied to the operating element;
   wherein the assembly member is disposed on an opposite side of the propeller shaft as the exhaust pipe.

8. The arrangement of claim 7, wherein the propeller shaft is connected to a differential.

9. The arrangement of claim 8, wherein the assembly member is connected to a switch for switching a diff-lock of the differential on and off.

10. The arrangement of claim 7, further comprising a back seat positioned behind the driver's seat, and a rear floor positioned between the driver's seat and the back seat, and wherein the assembly member is disposed beneath the rear floor.

11. The arrangement of claim 10, further comprising a lid that enables opening or closing at least part of the rear floor, the lid being provided on the rear floor facing the assembly member.

12. The arrangement of claim 7, wherein the operating element is a shift lever for switching the traveling mode of the vehicle to at least one of a park, reverse, neutral, high and low modes.

13. The arrangement of claim 7, wherein the operating element is operable to switch between two-wheel drive and four-wheel drive.

14. An arrangement for an assembly member of a vehicle comprising:
- a seat for an occupant of the vehicle;
- a floor positioned in front of the seat and providing a surface for the occupant's feet to rest;
- a transmission member having one end connected to an operating element and another end connected to the assembly member so as to operate with an operating force applied to the operating element;
- wherein the assembly member is disposed beneath the floor, and a lid enabling the opening or closing of at least part of the floor is provided on the floor facing the assembly member.

15. The arrangement of claim 14, wherein the seat is a back seat.

16. The arrangement of claim 15, further comprising a driver's seat in front of the back seat.

17. The arrangement of claim 16, wherein the floor is a rear floor, and the arrangement further comprises a front floor in front of the driver's seat, and wherein a height of the rear floor is greater than a height of the front floor.

18. The arrangement of claim 16, wherein the operating element is a shift lever disposed at the front seat for switching the traveling mode of the vehicle.

19. The arrangement of claim 14, further comprising a case for housing the assembly member.

20. The arrangement of claim 14, further comprising:
- a propeller shaft extending in a forward and backward direction of the vehicle;
- an exhaust pipe disposed on one side of the propeller shaft; and
- wherein the assembly member is disposed on an opposite side of the propeller shaft as the exhaust pipe.

* * * * *